(12) United States Patent
Bruce et al.

(10) Patent No.: US 8,282,731 B2
(45) Date of Patent: * Oct. 9, 2012

(54) CALCIUM SULFATE HEMIHYDRATE TREATMENT PROCESS

(75) Inventors: Robert Byron Bruce, Burlington (CA); Mark Richard Flumiani, Brantford, CA (US); Charles E. Blow, Bassingham-Lincoln (GB)

(73) Assignee: The Nugyp Corp., Ontario (CA)

( * ) Notice: Subject to any disclaimer, the term of this patent is extended or adjusted under 35 U.S.C. 154(b) by 119 days.

This patent is subject to a terminal disclaimer.

(21) Appl. No.: 12/890,242

(22) Filed: Sep. 24, 2010

(65) Prior Publication Data

US 2011/0011311 A1    Jan. 20, 2011

Related U.S. Application Data

(63) Continuation of application No. 11/957,667, filed on Dec. 17, 2007, now Pat. No. 7,824,490.

(60) Provisional application No. 60/871,039, filed on Dec. 20, 2006.

(51) Int. Cl.
*C04B 11/00* (2006.01)

(52) U.S. Cl. .................. 106/772; 423/555

(58) Field of Classification Search ............ 106/772; 423/555
See application file for complete search history.

(56) References Cited

U.S. PATENT DOCUMENTS

| | | |
|---|---|---|
| 1,713,879 A | 5/1929 | McAnally |
| 1,979,704 A | 11/1934 | Randel et al. |
| 2,177,668 A | 10/1939 | Marsh et al. |
| 2,282,091 A | 5/1942 | Redd |
| 3,281,508 A | 10/1966 | Goulounes |
| 3,415,910 A | 12/1968 | Kinkade et al. |
| 3,527,447 A | 9/1970 | Kinkade et al. |
| 3,770,468 A | 11/1973 | Knauf et al. |
| 3,829,280 A | 8/1974 | Jenne et al. |
| 3,898,316 A | 8/1975 | Flood et al. |
| 4,080,422 A | 3/1978 | McCleary |
| 4,201,595 A | 5/1980 | O'Neill |
| 4,238,445 A | 12/1980 | Stone |
| 4,360,386 A | 11/1982 | Bounini |
| 4,403,006 A | 9/1983 | Bruce et al. |
| 4,533,528 A | 8/1985 | Zaskalicky |
| 5,093,093 A | 3/1992 | Koslowski |
| 5,169,617 A | 12/1992 | Clemens et al. |
| 6,054,101 A | 4/2000 | Langfeldt et al. |
| 6,221,151 B1 | 4/2001 | Campbell et al. |

(Continued)

FOREIGN PATENT DOCUMENTS

CA         1189434        6/1985

(Continued)

OTHER PUBLICATIONS

Freyer, D. and Voigt, W., "Crystallization and Phase Stability of CaSO4 and CaSO4—Based Salts", Monatshefte fur Chemie 134, 693-719 (2003).

(Continued)

*Primary Examiner* — Paul Marcantoni
(74) *Attorney, Agent, or Firm* — Michael Best & Friedrich LLP

(57) ABSTRACT

A process for treating beta calcium sulfate hemihydrate is disclosed. The process comprises exposing beta calcium sulfate hemihydrate to steam at a pressure above atmospheric pressure.

23 Claims, 4 Drawing Sheets

U.S. PATENT DOCUMENTS

| | | |
|---|---|---|
| 6,485,821 B1 | 11/2002 | Bruce et al. |
| 6,652,825 B2 | 11/2003 | Sethuraman et al. |
| 6,703,331 B1 | 3/2004 | Bruce et al. |
| 6,706,113 B1 | 3/2004 | Couturier |
| 6,800,361 B2 | 10/2004 | Bruce et al. |
| 6,964,704 B2 | 11/2005 | Cox et al. |
| 7,335,254 B2 | 2/2008 | Bruce et al. |
| 7,556,791 B2 | 7/2009 | Bolind et al. |
| 7,695,561 B2 | 4/2010 | Cox et al. |
| 7,824,490 B2 * | 11/2010 | Bruce et al. .......... 106/772 |
| 2004/0182286 A1 | 9/2004 | Cox et al. |
| 2005/0152827 A1 | 7/2005 | Bold |
| 2005/0188898 A1 | 9/2005 | Bruce et al. |
| 2006/0010711 A1 | 1/2006 | Falinower |
| 2006/0231466 A1 | 10/2006 | Nuber |
| 2008/0069762 A1 | 3/2008 | Lynn et al. |

FOREIGN PATENT DOCUMENTS

| | | |
|---|---|---|
| CA | 1206980 | 7/1986 |
| DE | 2049028 | 4/1971 |
| DE | 37 38 301 | 5/1989 |
| EP | 1 547 984 | 6/2005 |
| GB | 1 233 436 | 5/1971 |
| GB | 2 086 874 | 5/1982 |

OTHER PUBLICATIONS

Kelly, K.K., Southard, J.C. and Anderson, C.F., "Thermodynamic Properties of Gypsum and its Dehydration Products", U.S. Bur. Mines,. Techn. Pap. 625 (1941).

Luckevich, L.M. and Kuntze, R.A., "The Relationship Between Water Demand and Particle Size Distribution of Stucco", The Chemistry and Technology of Gypsum, ASTM STP 861, R.A. Kuntze, Ed., American Society for Testing and Materials, 1984, pp. 84-96.

* cited by examiner

CALCIUM SULFATE HEMIHYDRATE TREATMENT PROCESS

CROSS-REFERENCES TO RELATED APPLICATIONS

This application is a continuation of U.S. patent application Ser. No. 11/957,667, filed Dec. 17, 2007, which claims priority from U.S. Provisional Patent Application No. 60/871,039, filed Dec. 20, 2006, both of which are incorporated herein by reference in their entirety.

FIELD OF THE INVENTION

The invention relates to processes for treating beta calcium sulfate hemihydrate. More specifically, the invention relates to post-calcination processes which reduce the water demand of beta calcium sulfate hemihydrate.

BACKGROUND OF THE INVENTION

Gypsum is the calcium sulfate dihydrate [DH] of the formula $CaSO_4.2H_2O$. Gypsum deposits exist around the world and have been used for centuries primarily in the building industry for structural and decorative purposes. More recently synthetic gypsum has come available as a byproduct from chemical processes or from the scrubbing of sulfur dioxide from the flue gases of coal burning power stations. The main commercial value from the use of gypsum results from its ability to lose three quarters of the water combined in the gypsum crystal upon heating, a process called calcining as illustrated in the reaction shown below.

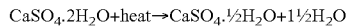

$CaSO_4.2H_2O + heat \rightarrow CaSO_4.\frac{1}{2}H_2O + 1\frac{1}{2}H_2O$

[gypsum][calcium sulfate hemihydrate or plaster of Paris]

Upon further heating at higher temperatures the hemihydrate will lose the remaining water and form soluble anhydrite or anhydrite III [AIII], which has a similar crystallographic structure to hemihydrate and is easily reconverted to hemihydrate by absorption of water vapor from the atmosphere. Exposure of hemihydrate to high humidity will not only convert any soluble anhydrite to hemihydrate, but will also slowly convert hemihydrate to gypsum and reduce the overall reactivity of the hemihydrate plaster, a process commonly called aging a plaster. Even further heating will result in the hemihydrate or soluble anhydrite converting to the insoluble anhydrite form, Anhydrite II [AII].

When the hemihydrate [HH] form is mixed with water to form a slurry at room temperatures, the hemihydrate dissolves in water and recrystallizes as gypsum, solidifying in the process. At room temperature hemihydrate is more soluble in water than gypsum, causing the hemihydrate to dissolve and the gypsum to precipitate. On a pure basis [100% pure gypsum] only 18.6 ml of water is required to convert 100 g of hemihydrate to gypsum.

There have been several methods demonstrated for the dehydration or calcination of gypsum to plaster of Paris, and various different types of hemihydrate produced by these different processes. The most commonly produced calcium sulfate hemihydrate is the "beta" form, in which the gypsum is finely ground and then calcined at high temperatures under normal atmospheric conditions to give a fast setting hemihydrate material. Another common type is called "alpha" in which the dehydration process is carried out under pressure conditions greater than atmospheric. One of the major differences between the alpha and beta forms of hemihydrate is the amount of water that is required to be mixed with the powdered hemihydrate to give a pourable slurry (i.e. the water demand). After vigorous mixing of the hemihydrate with water, a typical beta hemihydrate plaster will require between 75-100 ml of water per 100 g of plaster to give a pourable slurry. A typical alpha hemihydrate, on the other hand will require only 28 to 45 ml of water to give a pourable slurry with 100 g of plaster. There has been much discussion in the scientific literature regarding the differences between alpha and beta hemihydrate, and indeed between hemihydrate and forms with 0.67 or 0.8 moles of water per $CaSO_4$. For all practical purposes however, it would appear that all of these forms have essentially the same crystal structure. The difference between the hemihydrate and the more hydrated forms appears to be more water molecules being found in the open channels parallel to the crystallographic C axis. Although there appears to be some minor differences between the powder diffraction patterns of alpha and beta hemihydrate, the most recent thinking is that the beta hemihydrate is simply a more stressed and disordered form of the alpha hemihydrate bassanite structure.

Without being limited by theory, it is believed that this difference in water demand between alpha and beta hemihydrate is caused by a combination of physical and chemical effects resulting from the calcination process used to manufacture the hemihydrate. The beta hemihydrate calcination results in a stressed and disordered hemihydrate particle which will break into finer particles upon mixing in water. The interior surfaces of these fine particles are often highly charged resulting in a structured double ion layer surrounding these particles when mixed in water. The alpha hemihydrate particles, however, even when finely ground do not disintegrate into these fine particles and are generally lower in surface energy resulting in a less water being required to make a pourable mix, even after exposure to high shear forces. The rheological properties of aqueous hemihydrate mixtures are dependent on the surface chemistry and the particle size and shape of the hemihydrate particles after mixing in water.

The beta plasters are used in applications where a light weight fast setting product is required, whereas the alpha product is used where it is more important to have high strength and/or excellent detail in the casting of the setting plaster.

Whether alpha or beta hemihydrate is used, more water than is chemically required for hydration is added to the powder to achieve a pourable slurry. In most cases this extra water must be removed by a drying process which is very energy intensive and expensive. As a result there is an advantage to use a low water demand plaster in these cases to save drying costs. This is especially true when beta hemihydrate plaster is used, since much more water is mixed with the plaster than is needed to hydrate the hemihydrate to gypsum. A typical ½ inch (12.5 mm) thick gypsum board made with fast setting beta plaster, for example, needs to dry about 3.6 to 4 kg of water from each square meter of board whereas if it could be made with alpha hemihydrate then only about half of this amount of water would need to be dried off. The low water demand alpha plasters, however, have different setting properties making them unusable for some applications. These setting properties of an alpha hemihydrate are much too slow to be commercially viable for a modern gypsum board line.

Efforts have been made to reduce the evaporative load of these dryers by using chemicals such as dispersing agents [naphthalene sulfonates [NS], lignin sulfonates, melamine resins, etc.] to modify the surface properties of the hemihydrate particles in suspension and thus reduce the amount of water needed to make a pourable mix. These chemicals are quite expensive and limited in their effectiveness such that the water demand can be practically reduced by no more than 15% in most cases. These compounds are also often called water reducing agents or superplasticizers in the gypsum and cement industries.

There are two common commercial methods to make the low water demand alpha plaster, a "dry" process wherein lump gypsum rocks are calcined at high temperatures and pressures by live steam in a closed vessel and a "wet" process wherein the gypsum is slurried in water and calcined at high temperatures and pressures in a slurry to give the hemihydrate that needs to be filtered and dried before use. Note that the starting material for both the wet and dry processes is gypsum, in the former case in lump form and the latter case as a finely divided gypsum powder suspended in water in the autoclave.

There are also several different techniques to make the beta plaster, examples being a simple open tray in an oven, a rotary kiln, a commonly used kettle process operating in either a batch or continuous mode, as exemplified in FIG. 2, or flash calcined techniques where the gypsum is exposed to high temperature gases for a short period of time to remove the combined crystal water in the gypsum. The plaster characteristics resulting from these various processes can be quite different from one another not only as a result of the calcination equipment used but also the process parameters implemented during calcination. In general, however all of these processes under all conditions result in a hemihydrate plaster of water demand higher than those found for the alpha hemihydrate processes.

The ideal calcination to produce either the alpha or beta plasters will result in complete conversion from gypsum to hemihydrate. In practice, however, other species are produced: residual uncalcined gypsum, soluble anhydrite, insoluble anhydrite, or perhaps even calcium oxide.

It is well known in the industry that if the plaster is over-calcined so that some insoluble anhydrite is produced then the pourable water demand of the resultant plaster can be reduced. This is because some of the gypsum has been converted to the inert anhydrite form and is no longer available to set, as well as behaving as a surface treatment to the hemihydrate preventing it from disintegrating upon mixing. This practice has the disadvantage of restricting the setting characteristics of the resulting slurry and reducing the strength development properties of the setting slurry.

Similarly, different processes have been described where treatments are applied to the beta plaster to reduce the water demand in a manner similar to the natural aging process described earlier. U.S. Pat. No. 3,898,316 to Flood describes an aridization process whereby soluble salts are added to a continuous calcination to reduce the water demand. U.S. Pat. No. 3,415,910 to Kinkade describes a two step process whereby the gypsum is calcined to hemihydrate and then re-wetted and heated in the kettle once again to give a low water demand plaster. U.S. Pat. No. 4,533,528 to Zaskalicky describes the continuous calcination of wet synthetic or chemical byproduct gypsum to give a beta plaster of lower water demand as a result of the gypsum being wet when added to the kettle. U.S. Pat. Nos. 4,238,445 to Stone and 4,201,595 to O'Neill both describe processes whereby the plaster is treated with small amounts of liquid water, and ground to give a reduced water demand plaster, although there was some significant degradation of the ability of these plasters to develop strength on setting. In addition, if the plaster from these processes was not used immediately then it needed to be dried to avoid the plaster having unpredictable setting properties. U.S. Pat. No. 4,360,386 to Bounini also describes a process where the plaster is sprayed with an aqueous solution of a solubilizing agent while being ground to give a low water demand plaster. More recently U.S. Patent application Publication 2005/0152827 to Bold describes a multistep process involving treating beta plaster with a water and/or steam at 75 to 99° C., followed by curing and drying. In general the water spray/curing/drying processes result in an increase in residual gypsum content such that the treated plaster contains 3-7% dihydrate.

It is possible to reduce the water demand by these processes in the order of 15-30% but all of these forced aging processes are costly to implement in one form or another. In the case of aridization it is necessary to add soluble salts to the plaster, restricting its use in gypsum board applications and resulting in corrosion problems with the equipment in plaster applications. There are several treatments that are basically different ways of moistening, curing and drying. In general these processes limit production rates and require significant capital investment. In addition, as described recently by Bold, the two main concerns are unintended rehydration, which creates dihydrate, acting as crystallization seeds in plaster slurries as well as build-ups or scaling in the equipment. The formation of dihydrate can result in early stiffening of the setting mix, and yet the aged plaster is slow to dissolve resulting in a long dragged out final set. Overall the setting properties of this type of slurry make it very difficult to use in a rapid production process. As a result of these problems, the post-calcination treatment of beta plaster has had limited application, especially in the production of gypsum board. Aridization is commonly used for industrial plasters but a process to give a low water demand plaster without the addition of soluble salts would be welcomed by the industry.

It would seem that an alpha plaster would be more ideal for many of these beta plaster applications, but the production of alpha hemihydrate is much more costly and difficult to perform. In addition, the properties of an alpha plaster do not lend themselves very easily to processes where the hemihydrate slurry must set very quickly to give a low density, lightweight product, such as gypsum board.

If an application required a hemihydrate plaster intermediate between a typical alpha and beta plaster, the conventional manner to provide this product is to build two production facilities, one for alpha and one for beta, along with a blending plant to allow the production of a plaster intermediate between these two types of materials. U.S. Pat. No. 6,964,704 to Cox describes a process whereby gypsum is briquetted and then calcined in an autoclave to give a material that is intermediate in performance.

One of the ways that the gypsum industry uses to measure the setting properties of a hemihydrate plaster is to measure the temperature rise curve that results from the exothermic hydration of hemihydrate to gypsum. Different companies have different procedures/techniques to monitor this property. It is generally desired in the manufacture of gypsum board for the setting process to start off slowly to allow the paper face liners to be wet by the slurry, but to finish quickly so that the hydration process is as complete as possible before the board enters the dryer. One commonly used technique is to determine the maximum slope of the hydration curve (° C. per minute), with the preferred behavior being a very low slope immediately after mixing, and the maximum slope appearing very late in the overall hydration process. In this case, the hemihydrate board stucco is setting very fast until almost the very end of the hydration time. This is commonly associated with improved strength properties of the final slurry. The beta plasters perform very well by this measure, giving a set curve as exemplified by FIG. 1. A typical alpha plaster however, will have a higher overall temperature rise because of the lower water demand and lower mix heat capacity, but the overall setting process near the end of hydration is very sluggish and takes a long time to finish.

Other gypsum plaster applications require different setting properties. Wall plasters require more strength than would be typically found for a board plaster but require the "body" exhibited by a beta plaster but not by an alpha plaster. Molding plasters require the ability to provide accurate reproductions of detail and good strength properties, along with well-controlled expansion/contraction properties. Set control and crystal habit modifiers can be used to modify the properties of gypsum plasters to fine tune the performance needed, but in general the starting point has been an alpha plaster, a beta plaster, or a blend of the two.

The most commonly used additive to control the hemihydrate setting process is ground gypsum accelerator, effectively to act as seed crystals that provide a larger surface area of gypsum for the dissolved calcium and sulfate ions to crystallize upon. Ground gypsum accelerators are made in many forms by several processes in order to maximize or stabilize the activity of the gypsum crystal surface. Another type of accelerator also exists, commonly called chemical accelerators, which cause the chemical processes of dissolving the hemihydrate and transporting the calcium and sulfate ions to the growing gypsum crystals to take place more quickly. Typical chemical accelerators are potassium and aluminum sulfates, or other soluble sulfates, or sulfuric acid. Chemicals that increase ionic strength or increase the solubility of the hemihydrate more than that of the gypsum are also chemical accelerators.

There are several chemicals that can retard the rate of the hydration process as well. These materials are typically chelating agents that can interfere with the chemical activity of the calcium ions, or chemicals that interfere with the dissolving of the hemihydrate or chemicals that block the surface of the gypsum crystals from receiving soluble calcium and sulfate ions. Typical commercial retarders are diethylene triamine pentaacetic acid (DTPA), citric acid, tartaric acid and hydrolyzed keratin proteins; but many chemical compounds that adsorb on the surface of gypsum crystals will retard the hemihydrate setting process. Sugars found in lignin sulfonates, polyacrylic acids and polyphosphates, for example, are all effective retarders although they may be added to a setting hemihydrate slurry for another reason such as a dispersing agent.

SUMMARY OF THE INVENTION

In one broad aspect, a process for treating beta calcium sulfate hemihydrate is provided. The process comprises exposing beta calcium sulfate hemihydrate to steam at a pressure above atmospheric pressure.

An advantage of this broad aspect is that the treatment will reduce the water demand of the beta calcium sulfate hemihydrate. It has been found that the water demand of a beta calcium sulfate hemihydrate treated according to this broad aspect may be reduced by up to 40% or greater. Additionally, it has been found that the reduction in water demand can be enhanced with increased steam temperature and pressure. Additionally, it has been found that the treatment of beta calcium sulfate hemihydrate according to this broad aspect reduces the water demand of the treated plaster at steam pressures ranging from 0.1 psi to 210 psi above atmospheric (i.e. $psi_g$). Additionally, it has been found that the treatment of freshly calcined beta calcium sulfate hemihydrate according to this broad aspect reduces the water demand of the treated plaster at steam temperatures ranging from 100° C. to 200° C.

Another advantage is that a beta calcium sulfate hemihydrate treated according to this broad aspect may exhibit beneficial setting properties, without using high levels of chemical accelerator, retarding agents or chemical dispersants. That is, the setting properties of a slurry made with the beta calcium sulfate hemi hydrate treated according to this broad aspect may have similar setting properties to a slurry made with a high water demand untreated beta calcium sulfate hemihydrate.

Additionally, it has been found that the reduced water demand occurs for both natural and synthetic gypsum. Furthermore, it has been found that the water demand reduction may still take place if the beta calcium sulfate hemihydrate being treated contains high levels of soluble anhydrite.

Another advantage of this broad aspect is that if the untreated beta calcium sulfate hemihydrate contains residual calcium sulfate dihydrate, some of this dihydrate may be converted to hemihydrate in the process. Similarly, if the untreated beta plaster contains soluble calcium sulfate anhydrite, some of this soluble anhydrite may be converted to hemihydrate in the treatment process. Accordingly, a beta calcium sulfate hemihydrate treated according to this broad aspect may be closer to a chemical analysis of 100% hemihydrate than an untreated beta calcium sulfate hemihydrate.

Another advantage of this broad aspect is that the process may not result in the reduction of the compressive strength of cubes made with the treated beta calcium sulfate hemihydrate, compared to gypsum cubes of similar density and set time made with untreated plaster.

In some embodiments, the process comprises providing the beta calcium sulfate hemihydrate to a pressure chamber, and providing steam to the pressure chamber to reach a desired pressure. In further embodiments, the process comprises maintaining the pressure in the pressure chamber above atmospheric for a residence time of at least 5 seconds. Such embodiments are advantageous because the beta calcium sulfate hemihydrate will exhibit a reduced water demand after a relatively short treatment time. A treatment in accordance with this embodiment may achieve a reduced water demand after only seconds.

In some embodiments, the beta calcium sulfate hemihydrate is provided to the pressure chamber at an initial plaster temperature, and the steam is provided to the pressure chamber at an initial steam temperature, and the method further comprises selecting the initial plaster temperature, initial steam temperature, pressure, and residence time such that during the process less than 2% of the beta calcium sulfate hemihydrate is converted to calcium sulfate anhydrite, and the water demand of the beta calcium sulfate hemihydrate is reduced by at least 3%.

In some embodiments, the process further comprises releasing the pressure and cooling the beta calcium sulfate hemihydrate to a temperature below 60° C. In some such embodiments the initial plaster temperature, initial steam temperature, pressure, and residence time are selected such that less than 2% of the beta calcium sulfate hemihydrate is converted to calcium sulfate dihydrate during the cooling process.

In some embodiments, the initial plaster temperature is between 60° C. and 200° C., the initial steam temperature is between 100° C. and 200° C., the pressure is between 0.1 $psi_g$ and 210 $psi_g$, and the residence time is between 5 seconds and 900 seconds. Advantageously, it has been found that a beta calcium sulfate hemihydrate provided to a pressure chamber at 175° C. and exposed to steam at pressures of 65 $psi_g$ for 3 minutes will exhibit a water demand of 55 ml/100 g, whereas a similar untreated calcium sulfate hemihydrate will exhibit a water demand of 91 ml/100 g.

In some embodiments, the pressure chamber is heated to a chamber temperature, and the steam is heated in the pressure chamber to a final temperature higher than the initial temperature, and the method further comprises selecting the chamber temperature such that during the process less than 2% of the beta calcium sulfate hemihydrate is converted to calcium sulfate anhydrite, and the water demand of the beta calcium sulfate hemihydrate is reduced by at least 3%.

In some embodiments, the chamber temperature is between 115° C. and 200° C., the initial plaster temperature is between 60° C. and 200° C., the initial steam temperature is between 100° C. and 115° C., the final steam temperature is between 115° C. and 200° C., the pressure is between 0.1 $psi_g$ and 210 $psi_g$, and the residence time is between 5 seconds and 900 seconds.

In some embodiments, the steam has a dew point temperature at the pressure, and the steam is provided to the pressure chamber at an initial steam temperature within +/−5° C. of the dew point temperature.

In some embodiments, the steam has a dew point temperature at the pressure, and the steam is provided to the pressure chamber at an initial temperature less than the dew point temperature, and is heated in the pressure chamber to a final steam temperature within +/−5° C. of the dew point temperature.

In some embodiments, the steam is provided at an initial steam temperature between 100° C. and 200° C.

In some embodiments, the steam has a dew point temperature at the pressure, and the beta calcium sulfate hemihydrate is provided to the pressure chamber at a plaster temperature within +/−5° C. of the dew point temperature.

In some embodiments, the desired pressure is between 0.1 $psi_g$ and 210 $psi_g$. In further embodiments, the desired pressure is between 10 $psi_g$ and 200 $psi_g$.

In some embodiments, the residence time is between 5 seconds and 900 seconds. In further embodiments, the residence time is between 5 seconds and 600 seconds.

In some embodiments, the initial plaster temperature, initial steam temperature, pressure, and residence time are further selected such that a residual gypsum content of the beta calcium sulfate hemihydrate is reduced during the process. In further embodiments, the initial plaster temperature, initial steam temperature, pressure, and residence time are further selected such that the soluble anhydrite content of the beta calcium sulfate hemihydrate is reduced during the process.

In some embodiments, during the residence time, additional steam is provided to the pressure chamber. In some embodiments, prior to and during the residence time, the pressure chamber is heated.

In some embodiments, the method further comprises selecting the initial plaster temperature, initial steam temperature, pressure, and residence time such that during the process the set time of the beta calcium sulfate hemihydrate is increased by no more than 15%.

In a further broad aspect, a utilization process is provided for utilizing the product of the treatment process. The utilization process comprises mixing the calcium sulfate hemihydrate with water to form a pourable slurry.

In some embodiments, 10 parts of the calcium sulfate hemihydrate are mixed with less than 7.5 parts water by weight to form the pourable slurry.

In another broad aspect, a process for treating beta calcium sulfate hemihydrate is provided. The process comprises providing a quantity of beta calcium sulfate to a pressure chamber at a plaster temperature; and providing steam at an initial steam temperature to the pressure chamber to reach a pressure above atmospheric pressure in the pressure chamber. The initial plaster temperature, initial steam temperature, and pressure are selected such that less than 2% of the beta calcium sulfate hemihydrate is converted to calcium sulfate anhydrite, and the water demand of the beta calcium sulfate hemihydrate is reduced by at least 3%.

In some embodiments, the process further comprises maintaining the pressure in the pressure chamber above atmospheric for a residence time. In further embodiments, the process comprises releasing the pressure and cooling the beta calcium sulfate hemihydrate to below 60° C. In some such embodiments, the initial plaster temperature, initial steam temperature, and pressure are further selected such that during cooling, less than 2% of the beta calcium sulfate hemihydrate is converted to calcium sulfate dihydrate.

In some embodiments, the initial plaster temperature is between 60° C. and 200° C., the initial steam temperature is between 100° C. and 200° C., the pressure is between 0.1 $psi_g$ and 210 $psi_g$ and the residence time is between 5 seconds and 900 seconds.

In some embodiments, the pressure chamber is heated, and the steam is heated in the pressure chamber to a final steam temperature higher than the initial steam temperature.

In some embodiments, the initial plaster temperature is between 100° C. and 200° C., the initial steam temperature is between 100° C. and 115° C., the final steam temperature is between 115° C. and 200° C., the pressure is between 0.1 $psi_g$ and 210 $psi_g$, and the residence time is between 5 seconds and 900 seconds.

In some embodiments, the initial plaster temperature, initial steam temperature, pressure, and residence time are further selected such that a residual gypsum content of the beta calcium sulfate hemihydrate is reduced during the process. In further embodiments, the initial plaster temperature, initial steam temperature, pressure, and residence time are further selected such that a soluble anhydrite content of the beta calcium sulfate hemihydrate is reduced during the process.

In another broad aspect, another process for treating beta calcium sulfate hemihydrate is provided. The process comprises providing a quantity of beta calcium sulfate to a pressure chamber at a temperature of between 120° C. and 190° C.; providing steam at a temperature of between 115° C. and 195° C. to the pressure chamber to reach a pressure of between 10 $psi_g$ and 200 $psi_g$ in the pressure chamber; and maintaining the pressure in the pressure chamber at between 10 $psi_g$ and 200 $psi_g$ for between 5 and 900 seconds

BRIEF DESCRIPTION OF THE DRAWINGS

These and other advantages of the present invention will be more fully and particularly understood in connection with the following description of the preferred embodiments of the invention in which.

DETAILED DESCRIPTION OF THE INVENTION

Description of Test Methods

Figure 1:
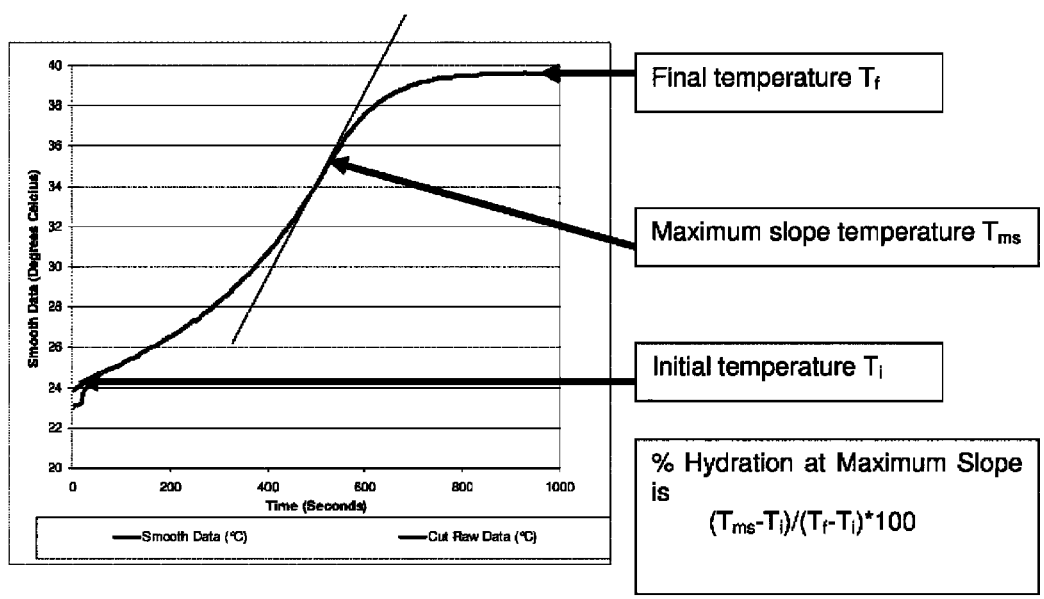
FIG. 1 is an example of a set curve exhibited by known beta calcium sulfate hemihydrates.

Gypsum Phase Analysis: The percent composition of dihydrate, hemihydrate, anhydrite (III), free water, and other material was determined through a gravimetric gypsum phase analysis procedure as follows: An empty container was weighed on a balance accurate to 0.0001 g. 4 to 6 grams of sample was added to the container (previously fine ground with mortar and pestle as necessary) and weighed and left in air at 60-80% relative humidity overnight. The sample was then dried for 2 hours at 45° C. in a digitally controlled constant temperature oven by Yamato DKN600 (Santa Clara, Calif.) and weighed afterwards. Next, 20 mL of distilled water was added to the sample, the sample was covered and then allowed to rehydrate at room temperatured for 2 hours. Afterwards, the sample was again dried overnight at 45° C. and weighed afterwards. The sample was then heated for 2 hours at 300° C. in a Sentry Xpress 2.0 kiln by Orton (Westerville, Ohio). The sample was then covered and cooled briefly and weighed as soon as possible. Finally, the weight % free water, soluble anhydrite (III), % dihydrate, % hemihydrate and % other material was calculated from the weight results.

Moisture Balance Analysis: Moisture content was determined by the weight loss of a sample during heating in an Ohaus MB45 moisture analyzer (Pine Brook, N.J.). A sample pan was weighed and approximately 2 grams of sample was added to the sample pan. The pan and sample underwent a maximum rate heat ramp to 200° C. until the weight loss had stabilized and percent moisture was recorded.

Continuous Kettle Calcination: A continuous calcination operates by maintaining a steady feed into and out of a kettle. The laboratory scale continuous kettle apparatus used was a custom built 20 liter vessel with a mechanical stirrer, designed such that plaster is produced from the bottom of the kettle once the kettle is full to a certain volume (see FIG. 4). The kettle was heated by the use of two heat sources, one jacket around the sides of the kettle and one on the bottom base of the kettle each variably controlled by a 10 amp, 1.4 KVA Variac by Staco Energy Products (Dayton, Ohio). A continuous calcination process was conducted by maintaining the desired temperature in the kettle by continuously feeding gypsum on a variable basis with an Eriez (Erie, Pa.) N12-G30 HZ-115/230 vibrator feeder. The material was fed into the top of the kettle, when the volume of the kettle reaches a certain capacity, material is forced from the bottom out through a weir tube on the side of the kettle. The weir tube had an air lance that keeps the material fluidized as it came up the weir tube to the discharge port. The mechanical stirrer agitated the bed so that there was an even temperature distribution in the kettle. The operation of the kettle was initiated by turning on the heaters, dust extractor, mechanical stirrer, air lance and temperature recording devices. Once the kettle had reached around 130° C. the feed of gypsum was started. The kettle continued to heat up as material was fed in until the control temperature was reached after which the gypsum was fed into the kettle to keep the temperature at a constant level. The kettle took approximately 45 minutes to fill and once it was producing calcined material it was left for another 45 minutes (approximately) in order to allow for the operation to become settled and have a uniform output. Temperatures were monitored at the bottom of the weir tube and near the top of the bed by a type K thermocouple. The temperature data was read by a Sper Scientific 800024 thermometer (Scottsdale, Ariz.) with the appropriate computer logging software.

Batch Calcination: The operation of a batch calcination was conducted by preheating the kettle between 140° C. and 160° C. and then the feed was started. Batch calcinations calcined approximately 9 kg of plaster. The feed rate in the batch calcination was kept constant at 150 grams/minute in order to achieve a kettle fill time between 45 and 90 minutes. Once the feed was started the kettle temperature dropped, after which the side heaters were manually cycled on and off such that the temperature was maintained between 110° C. and 120° C. Once the feed to the kettle was stopped the kettle operated with only the bottom heaters on such that the temperature of the plaster rose gradually. The temperature of the plaster increased because the amount of water being driven off decreased and there was less to drive off. When the temperature reached between 145° C. and 155° C. the plaster was removed by opening the bottom gate on the kettle. If an aridized batch calcination is conducted calcium chloride was added with the gypsum during the calcination process. For a 9 kg batch there was an addition of 0.1% of calcium chloride by weight, or 9 grams for the full batch calcination. The operation of the batch calcination was conducted in the same manner as an aridized batch, only without the addition of calcium chloride.

Particle Size Analysis Malvern: Particle size distribution was measured using a Malvern Mastersizer 2000 (Worcestershire, United Kingdom). The test was conducted by dispersing the sample in a solution of isopropyl alcohol in a wet dispersion unit operating at 1800 RPM. A material density setting of "gypsum (avg)" was assumed and the measurement was performed at between 10 and 20 obscuration, after background subtraction.

Machine Mix Water Demand: A machine mix water demand measurement was determined by adding 400 grams of plaster over 30 seconds to an iteratively investigated amount of room temperature equilibrated water containing 1.0 g of sodium citrate, in a blender (Cuisinart SmartPower (East Windsor, N.J.)) followed by mixing for 7 seconds at the highest speed. The blended slurry was then poured into a 2 inch diameter, 4 inch tall cylinder on a clean glass plate. Once the tube was filled it was lifted in a swift vertical motion allowing the slurry to spread into a patty of a measured diameter (known as slump). The target diameter of the plaster at its described water demand was 7.5 inches.

Compressive Strength: The compressive strength of a set gypsum cube was tested by setting plaster in the form of 2 inch cubes, and mechanically tested by a hydraulic compression test machine from Test Mark Industries (Beaver Falls, Pa.). 600 grams of plaster was mixed to a described water demand, over the course of 30 seconds followed by blending for 7 seconds. The slurry was then poured into a 2 inch cube mould in excess with the corners puddle with a spatula to remove any entrained air voids. The excess slurry was later struck off to level with a putty knife prior to complete hydration while the cubes were removed from the mould after complete hydration. The Vicat setting time was measured using a Vicat test instrument by Humboldt MFG CO. (Norridge Ill.). The cubes were weighed wet and dried overnight at 45° C. The cubes were weighed again after drying to constant mass was complete. The cubes were then tested in the hydraulic compression test machine with the top surface of the cube facing the side to avoid any effects due to sedimentation from gravity. The cubes were tested at a loading rate of 60 to 160 lbs/sec. The peak strength was recorded and divided by the surface area of the cube and reported as the compressive strength.

Temperature Rise Set Curves: The set curve of a plaster sample was determined by measuring the exothermic temperature rise of a plaster slurry as a function of time in an insulated calorimeter using an Extech Instruments 421508 Thermometer (Waltham, Mass.) and type K thermocouple. 400 grams of plaster were added to a described amount of water over 30 seconds and blended for 7 seconds. The mix was then poured into a styrofoam cup in the calorimeter and sealed while the temperature was recorded at 0.1 C accuracy in 1 second increments. The resulting temperature versus time data curve was analyzed to determine the temperature rise, the 98% set time and the time and temperature of the maximum slope. In some examples, where ball milled accelerator was added, this accelerator was made by ball milling 750 g of raw gypsum and 15 grams of a surfactant Nansa HS90/AF (Albright & Wilson Americas, Glen Allen, Va., USA) in Lortone QT12/QT66 Rotary Tumbler (Seattle, Wash., USA) for 240 minutes. The Rotary Tumbler was loaded with 40 of 1 inch diameter steel balls and 20 of 1 inch diameter steel cylinders 1 inch long.

Embodiments of the invention provide a process for the post-calcination treatment of a beta calcium sulfate hemihydrate, which provides a beta calcium sulfate hemihydrate with improved characteristics. The process involves exposing calcium sulfate hemihydrate (referred to hereinafter as plaster) to steam at pressures above atmospheric. The process, when carried out under conditions described below, reduces the water demand of the plaster to a desired level. In some embodiments, the water demand of the plaster is reduced by at least 3%, and up to 40% or greater. In some embodiments, the process is carried out under conditions which reduce the water demand of the plaster to a desired level, while not promoting the conversion of the plaster to insoluble calcium sulfate anhydrite, and not promoting the conversion of the plaster to calcium sulfate dihydrate (gypsum). The conditions will presently be described.

In accordance with the invention, the water demand of the plaster may be reduced to a desired level by exposing the plaster to steam at pressures above atmospheric in a pressure chamber for a period of time (referred to hereinafter as the residence time). It has been found that the reduction in water demand occurs over a wide range of steam temperatures and pressures. Surprisingly, it has been found that the treatment can be effective whether the steam is provided as superheated steam or as saturated steam or in a condensing environment. Surprisingly, it has also been found that the residence time required to achieve a reduction in water demand is reduced as the pressure in the pressure chamber is increased, and the temperature of the steam is increased. It has also been found that the treatment process is surprisingly rapid in effect under certain conditions. Furthermore, it has been found that the reduction in water demand can be altered depending on the residence time. Accordingly, a user may select a residence time based on the desired characteristics of the plaster. It has also been found that the treatment conditions can be very effective while at the same time resulting in a plaster after treatment with very low levels of adsorbed water and as a result may reduce the conversion of plaster to gypsum upon cooling of the treated plaster.

In order to reduce the conversion of the plaster to gypsum during the process, the plaster may be provided at a temperature above the temperature at which conversion to gypsum occurs, and the amount of water available to be adsorbed by the plaster may be reduced. Generally speaking, plaster will convert to gypsum in the presence of water at temperatures below 60° C. Accordingly, the plaster may be provided to the process above 60° C. Additionally, the amount of water available to be adsorbed by the plaster may be reduced by reducing the amount of steam which condenses during the treatment process. This can be beneficially influenced by providing the plaster to the process at an even further elevated temperature, i.e. well above 60° C. In so doing, there is less water to convert the plaster to gypsum when the plaster cools to below 60° C. after the completion of the process. In some embodiments, the plaster may be provided at a temperature close to the dew point of the steam. In further embodiments, the plaster is provided at or above the dew point of the steam. That is, in an embodiment wherein the process is carried out at a pressure of 40 $psi_g$, and the steam is provided at or heated to at least 143° C. (which is the dew point at 40 $psi_g$), the plaster may be provided at a temperature at or above 143° C., to inhibit the steam from condensing on the plaster. In further embodiments, the plaster is provided at a temperature below the dew point of the steam, resulting in the steam condensing into the plaster and the plaster temperature being raised towards and eventually to the temperature of the steam applied. Surprisingly the treatment process is still effective in reducing the water demand of the plaster without resulting in excessive gypsum levels in the treated plaster after cooling the plaster to below 60° C.

In some embodiments, in order to reduce the conversion of the plaster to insoluble anhydrite, the steam is provided at a temperature that is low enough to discourage the formation of insoluble anhydrite from the plaster. It has been found that such temperatures below about 200° C. inhibit such formation.

Figure 3:
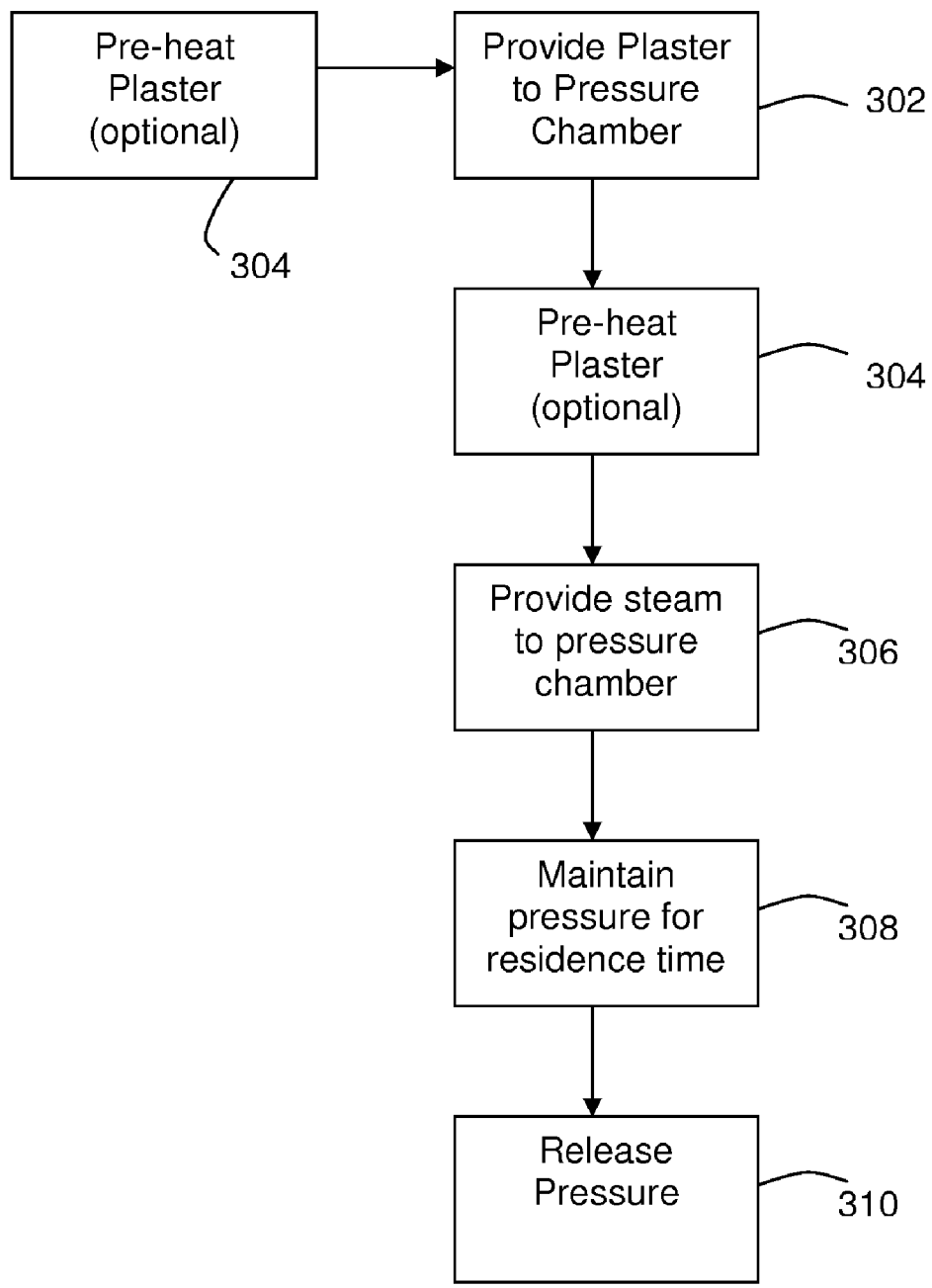
FIG. 3 is a flow diagram of an embodiment of a process in accordance with the present invention.
Figure 4:
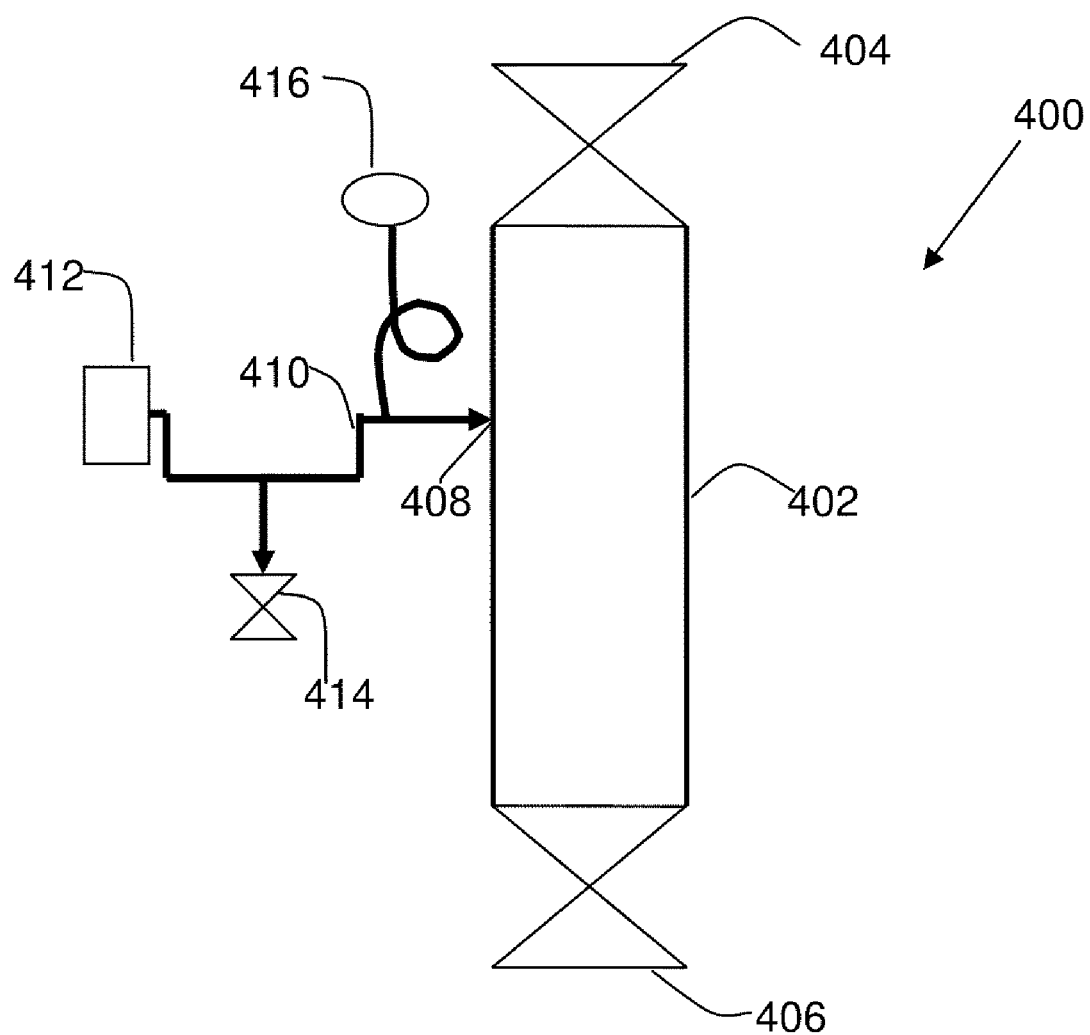
FIG. 4 is a front view of an embodiment of a pressure chamber suitable for use in the process of the present invention.

As is known to those of skill in the art, calcination of gypsum to produce plaster is generally carried out at temperatures from about 120° C. to about 190° C. It has been found that if the plaster is taken from the calcination process and provided to this inventive treatment process, without an intermediate storage phase, the temperature of the plaster is suitable for reducing the water demand of the plaster in the treatment process. It has also been discovered that the water demand reduction can take place without causing gypsum formation or insoluble anhydrite formation during the process. In some embodiments, the treatment process has resulted in the reduction of gypsum content. In other embodiments it has reduced the soluble anhydrite content. Accordingly, in some embodiments, in order to reduce the water demand of the plaster to a desired level in a reduced amount of time, and avoid the conversion of the plaster to gypsum after cooling, the process involves providing plaster to the pressure chamber directly from the calcination process while the plaster temperature is between 120° C. and 190° C., and providing steam at a temperature of between 100° C. and 200° C. until the pressure in the pressure chamber is at or near the dew point of the steam, and maintaining the pressure for a given residence time. Alternatively, this process has also been shown to be effective at reducing the water demand of stored room temperature plaster that has been reheated at a later time Referring to FIG. 3, an exemplary process 300 for the post-calcination treatment of beta calcium sulfate hemihydrate (plaster) is shown. The described process is a batch process; however, it is contemplated that the process may be a continuous or semi-continuous process. At step 302, the plaster is provided to a pressure chamber. The pressure chamber may be any suitable pressure chamber known in the art. An embodiment of a suitable pressure chamber 400 is shown in FIG. 4. In the embodiment shown, pressure chamber 400 comprises a chamber body 402, a plaster inlet 404, a plaster outlet 406 and a steam inlet 408. Body 402 may be, for example, fabricated from 3 inch diameter stainless steel pipe. In some embodiments, body 402 may be cylindrical. Plaster inlet 404 and plaster outlet 406 may comprise, for example, ball valves. More specifically, in some embodiments, plaster inlet 404 and/or plaster outlet 406 may comprise valves commercially available under the name Spheri Valve, from Clyde Materials Handling, Doncaster U.K. In the embodiment shown, the steam inlet 408 is provided at a side wall of the pressure chamber, and is positioned centrally along the height of the chamber. In other embodiments, the steam inlet may be provided in a bottom wall of the pressure chamber, or in a top wall of the pressure chamber. A conduit 410 is coupled to the steam inlet 408, for providing steam to the steam inlet 408 from the steam source 412. Steam source 412 may be, for example, a boiler. Conduit 410 may be, for example, copper tubing having an interior diameter of about ¼ inch. A venting valve 414 is coupled to the steam conduit 410, for releasing the pressure in the pressure chamber. A pressure indicator 416 is coupled to the steam conduit 410 for measuring the pressure of the incoming steam. In some embodiments, the pressure chamber body 402 may be provided with a heating member (not shown) for heating the walls of the pressure chamber. Additionally, the steam conduit 410 may be provided with a heating member. The heating member may comprise heating tape, for example, which is wrapped around the pressure chamber body 402 and/or the steam conduit. In some particular embodiments, the heating tape may be 120V heating tape having a width of 1 inch. In other embodiments, the pressure chamber may not be heated. For example, the pressure chamber may be insulated such that there is sufficient heat from the steam and plaster to avoid condensation on the walls of the chamber without having to provide external heating to the chamber. In some embodiments (not shown) a temperature sensor, such as a thermocouple or a thermometer may be provided inside the pressure chamber body 402. In some particular embodiments, the thermocouple may be provided on a wall of the pressure chamber, and may be positioned centrally along the height of the pressure chamber.

Referring again to FIG. 3, the plaster may be provided to the pressure chamber at an elevated temperature (referred to hereinafter as the initial plaster temperature). In some embodiments, the plaster is provided at an initial plaster temperature of between 60° C. and 200° C. More specifically, in some embodiments, the plaster may be provided at an initial plaster temperature of between about 120° C. and 190° C. In some embodiments, the plaster may be provided to the pressure chamber directly from a calcination process. In such embodiments, the plaster may be heated to the initial plaster temperature in the calcination process, and no additional heating of the plaster may be required. In other embodiments, the plaster may be provided from elsewhere, for example a storage tank. In such embodiments, at step 304, the plaster may be pre-heated prior to being provided to the pressure chamber. In other embodiments, the plaster may be provided to the pressure chamber directly from the storage tank, and may be pre-heated in the pressure chamber prior to steam treatment.

The plaster may be provided to the pressure chamber in a variety of forms. Furthermore, the plaster may not be pure calcium sulfate hemihydrate, and may comprise one or more of a residual gypsum content, a soluble calcium sulfate anhydrite content, an insoluble anhydrite content, as well as other residual compounds. In some embodiments, the plaster is provided as a powder, and is deposited into the pressure chamber to form a loosely packed bed. In some embodiments, the pressure chamber has a volume of between about 0.0015 cubic meters and about 10 cubic meters, and is filled with plaster such that the loosely packed bed comprises between about 50% and about 95% of the volume, and such that the loosely packed bed has a void space of between about 40% and 80%. However, in alternate embodiments, alternate volumes, quantities of plaster, and void space may be used.

At step 306, steam is provided to the pressure chamber. The steam may be provided until a desired pressure is reached in the pressure chamber. In some embodiments, the desired pressure is between 0.1 $psi_g$ and 210 $psi_g$. More specifically, in some embodiments, the desired pressure is between 10 $psi_g$ and 200 $psi_g$. In some particular embodiments, the pressure is selected such that at the pressure, the dew point temperature of steam is at or near (i.e. within +/−5° C. of) the temperature of the plaster. For example, if the initial plaster temperature is 143° C., the pressure may be selected to be about 40 $psi_g$, which is the pressure at which the dew point of steam is 143° C. In other embodiments, the pressure may be above or below the dew point pressure of steam at the plaster temperature.

The steam may be provided at a wide range of temperatures. In some embodiments, the steam may be provided at an initial temperature, and may remain essentially at the initial temperature (e.g. within +/−5° C. of the initial temperature) for the duration of the process. In other embodiments, the steam may be provided at an initial temperature, and may be heated to a final temperature higher than the initial temperature within the pressure chamber. In either case, the pressure chamber may be provided with heated walls, either for maintaining the steam at the initial temperature, or for heating the steam to the final temperature.

In embodiments wherein the steam is provided at the initial temperature and maintained essentially at the initial temperature for the duration of the process, the initial temperature may be between about 100° C. and about 200° C. More specifically, in some embodiments, the initial temperature may be between about 115° C. and about 195° C. In some embodiments, the steam may be provided such that when the desired pressure is reached, the steam is superheated. For example, the steam may be provided at a temperature of about 143° C., until a pressure of about 22 $psi_g$ is reached in the pressure chamber. In other embodiments, the steam may be provided such when the desired pressure is reached, the steam is saturated. For example, the steam may be provided at a temperature of about 143° C., until a pressure of about 40 $psi_g$ is reached in the pressure chamber. In yet other embodiments, the steam may be provided such that when the desired pressure is reached in the pressure chamber, the steam is at condensing conditions. For example, the steam may be provided at a temperature of about 153° C., until a pressure of about 60 $psi_g$ is reached in the pressure chamber.

In other embodiments, as previously mentioned, the steam may be provided at an initial temperature, and may be heated to a final temperature within the pressure chamber. In some embodiments, the steam may be provided at an initial temperature of between about 100° C. and about 115° C., and may be heated to a final temperature of between about 115° C. and about 200° C. within the pressure chamber. More specifically, in some embodiments, the steam may be provided at an initial temperature of about 100° C. and may be heated to a final temperature of between about 115° C. and about 195° C. within the pressure chamber. For example, the steam may be provided at 100° C., and the walls of the pressure chamber may be heated to 143° C. Accordingly, as the steam is added, the temperature of the steam will rise towards a final temperature of 143° C.

In any of the above described embodiments, the initial temperature of the plaster, the initial and final temperature of the steam, and the temperature of the chamber walls may have a variety of relationships. In some embodiments, the initial plaster temperature and the chamber temperature may be higher than the initial temperature of the steam. Accordingly, the steam will be heated to the final temperature within the pressure chamber. In other embodiments, the initial plaster temperature, the initial and final steam temperature, and the chamber temperature may be similar or essentially the same. In such embodiments, the steam temperature may remain constant within the pressure chamber. In other embodiments, the initial steam temperature and the chamber temperature may be hotter than the initial plaster temperature. In such embodiments, some steam may condense on the plaster as the steam is added to the pressure chamber.

When the desired pressure is reached, the flow of steam to the pressure chamber may be stopped, and the pressure may be maintained in the pressure chamber for a residence time (step 308). During the residence time, additional heat may be provided to the pressure chamber, for example by heating the walls of the pressure chamber. Furthermore, during the residence time, additional steam may be provided to the pressure chamber. The residence time may be selected based on the desired characteristics of the plaster. It has been found that a reduction in the water demand of the plaster can be achieved for residence times of as low as 5 seconds. However, as the residence time is increased, the reduction in water demand is enhanced. Accordingly, in some embodiments, the residence time is between 5 seconds and 900 seconds. In further embodiments, the residence time is between 5 seconds and 600 seconds. In one particular embodiment, the residence time is 300 seconds. In alternate embodiments, the residence time may be greater than 900 seconds. For example, in the manufacture of wallboards, it may be desired to reduce the water demand of the plaster by about 15%. Accordingly, the residence time may be between 30 and about 120 seconds, depending on the other process variables. In another example, in the manufacture of moulds for the ceramics industry or for floorscreed binder, it may be desired to reduce the water demand of the plaster by about 35%. Accordingly, the residence time may be about 300 seconds or greater, depending on the other process variables.

At step 310, the pressure in the pressure chamber is released. The plaster may be immediately removed from the pressure chamber, or may be allowed to cool within the pressure chamber. Over the course of the residence time, depending on the temperature of the steam, the plaster, and the chamber walls, some steam may condense and be adsorbed into the plaster, as was previously described. It has been found that when the pressure is released, a portion of the condensed steam evaporates. Accordingly, when the plaster cools below 60° C., a reduced amount of water is available to convert the plaster to gypsum.

When the plaster has cooled, it may be stored, and/or used to produce gypsum board products such as fiber boards, wall boards, and flooring compositions, or other products such as ceiling boards, floor boards, exterior sheathing boards, gypsum blocks, ceiling tiles, high strength wall plasters, glass reinforced gypsum panels, ceramic moulds, statuary, modeling plasters, pattern making plasters, architectural mouldings, casting plasters, engineering plasters, absorbent granules, mine subsidence cements and guniting. In order to produce the gypsum board products, the treated plaster may be combined with water to form an aqueous slurry. It has been found that plasters treated according the process 300 exhibit a reduced water demand (i.e. require less water to form a pourable slurry) as compared to untreated plasters. Accordingly, in some embodiments, the treated plaster may be combined with between about 3% and about 40% less water than would be required for an untreated plaster. For example, if an untreated plaster required about 78 ml of water per 100 g of plaster to form the slurry, the treated plaster may be combined with less than 75 ml of water per 100 g of plaster to form the slurry.

After mixing with water and various additives, the slurry may be poured into a mould, formed between paper sheets, applied to wall surfaces or poured onto floors, pumped and sprayed onto surfaces or into moulds, and may be left to set. It has been found that slurries made with a plaster treated according to process 300 exhibit beneficial properties normally associated with plasters having higher water demands. That is, slurries made with a plaster treated according to process 300 are fluid, reduce drying costs, reduce dispersant costs, are strong when set, provide good detail in castings, have low soluble salt levels, and have long mould life. They also allow efficient manufacturing processes by showing good response to accelerator to give short set times without early stiffening or delayed final set in the hydration curve.

EXAMPLES

Example 1

Treatment of Natural Gypsum Hemi-Hydrate Plaster

Figure 2:
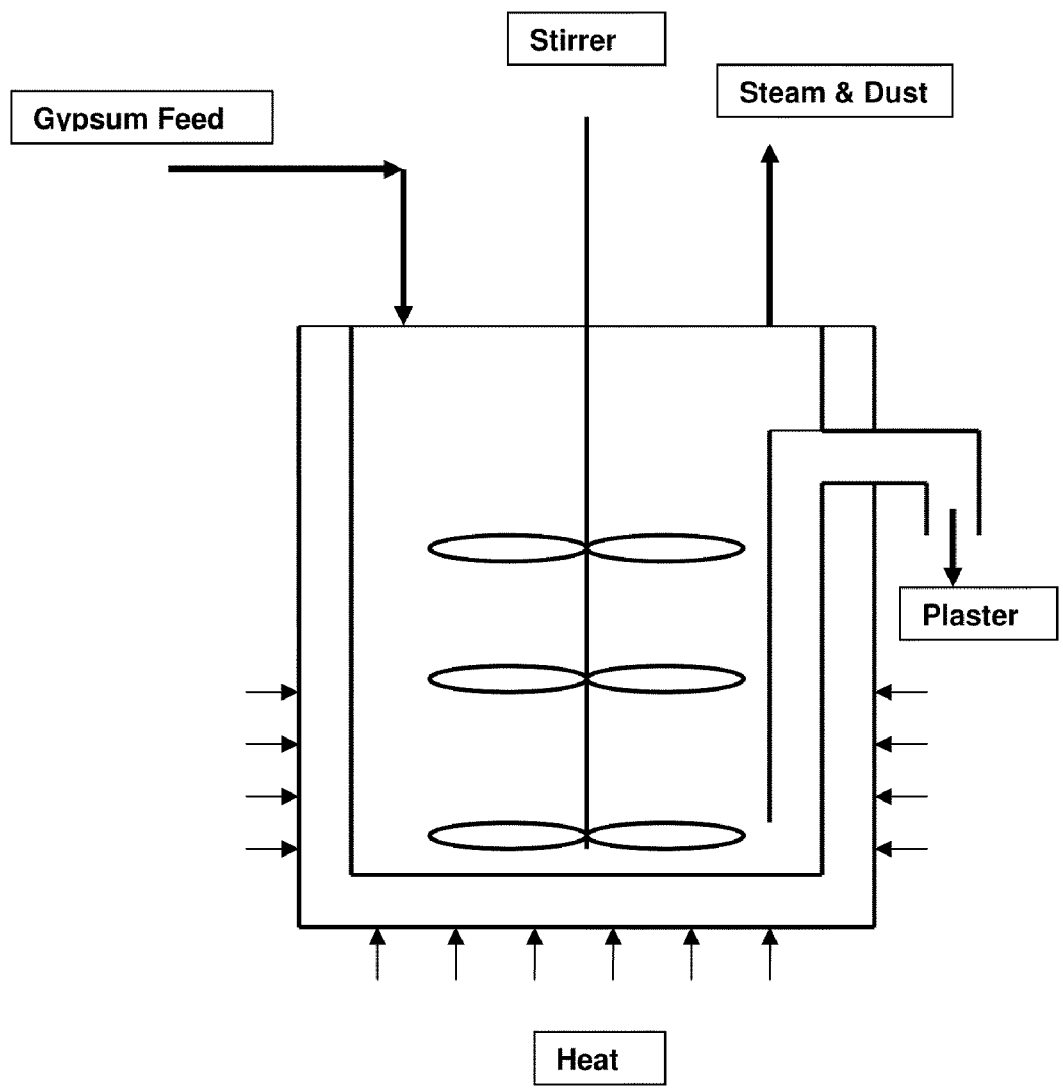
FIG. 2 is an example of a known process used in the calcination of gypsum.

A laboratory scale continuous kettle calcination was performed using three natural gypsum samples; a lower purity sample called LP2 from USG, Chicago, USA, a high purity gypsum sample called HP1 used in the manufacture of gypsum board, and a high purity very finely ground gypsum called Terra Alba (TA) also sold by USG, Chicago, USA. Calcination temperatures for the 3 gypsum samples were 160° C., 160° C. and 165° C. respectively, which correspond to the initial plaster temperatures in the treatment process. This kettle has been shown in previous studies to be an accurate model of production kettles currently in use around the world. The gypsum phase analysis of this plaster showed the purity levels to span the range that would be considered typical of what is commonly in use around the world. A diagram of the laboratory kettle apparatus is shown in FIG. 2 and is described below.

The treatment process was carried out using a pressurized vessel as shown in FIG. 4. This pressure vessel consisted of a vertical pipe of inside diameter 3 inches fitted with an inlet port to allow steam entry, a pressure gauge to monitor internal pressure, and a vent port to release the pressure after treatment. To enable flow of material through the treatment chamber, large valves were attached at both the top and bottom of the treatment chamber such that the bottom valve could be closed, the fresh plaster poured in through the top open valve, and then the top valve be closed to enable the chamber to be pressurized. After treatment was complete, the chamber was vented and the bottom valve was opened to release the plaster for testing.

The treatment chamber was located so that plaster coming from the kettle was able to fall directly into a storage area above the top valve for the treatment apparatus in order to maintain the high temperature of the plaster. In addition the overall treatment apparatus was held at high temperature through the use of a heating tape wrapped around the stainless steel treatment chamber and initial storage area. The overall temperature of the chamber prior to addition of the plaster was approximately the calcination temperature to make sure that the plaster was not cooled by the pressure chamber. The steam was provided by a boiler operating at 150° C. The pressure inside the chamber was monitored and steam was added until the target pressure was achieved, being topped up as needed to maintain the pressure. This pressure was maintained for various time periods to determine the impact of treatment time for trials at 40 $psi_g$ and 20 $psi_g$ steam pressure, these pressures establishing the minimum steam temperatures within the chamber assuming saturated steam conditions. Since the plaster was above this temperature the steam superheated to the plaster temperature.

Samples were taken after residence time of 0 minutes (i.e. bringing the chamber up to pressure and then immediately releasing it), up to 30 minutes.

The plaster samples were analyzed for phase composition with the results as shown below.

Treatment Results for Laboratory Kettle Calcined Natural Gypsum

| Natural Gypsum Source | Pressure (psig) | Time (min) | Free water % | AIII % | HH % | DH % | Other % | Mineral Average Particle Size (µm) | WD (ml/100 g) |
|---|---|---|---|---|---|---|---|---|---|
| LP2 | untreated |   | 0.10 | 0.00 | 61.94 | 13.23 | 24.82 | 33.5 | 77 |
| LP2 | 40 | 0 | 0.34 | 0.00 | 68.48 | 7.09 | 24.43 |  | 70 |
| LP2 | 40 | 5 | 0.27 | 0.00 | 68.29 | 7.15 | 24.56 |  | 49 |
| LP2 | 40 | 10 | 0.34 | 0.00 | 71.65 | 3.13 | 25.22 |  | 55 |
| LP2 | 40 | 30 | 2.36 | 0.00 | 65.63 | 8.67 | 25.70 |  | 56 |
| LP2 | 20 | 5 | 0.28 | 0.00 | 61.03 | 13.26 | 25.71 |  | 69 |
| LP2 | 20 | 10 | 0.44 | 0.00 | 65.46 | 9.27 | 25.28 |  | 62 |
| HP1 | untreated |   | 0.00 | 3.29 | 84.65 | 3.49 | 8.57 | 35.5 | 86 |
| HP1 | 40 | 3 | 0.30 | 0.05 | 88.21 | 3.10 | 8.64 |  | 63 |
| HP1 | 40 | 5 | 0.37 | 0.00 | 88.88 | 2.73 | 8.40 |  | 56 |
| TA | untreated |   | 0.00 | 8.43 | 81.95 | 2.61 | 7.01 | 21.2 | 80 |
| TA | 40 | 3 | 0.00 | 1.59 | 88.58 | 2.15 | 7.68 |  | 66 |

The chemical analysis showed only modest changes to the phase analysis, with a small amount of residual gypsum found in the plaster being converted to hemihydrate with the steam treatment. Also, when the hemihydrate sample contained soluble anhydrite, then the treatment converted some of this to hemihydrate but not necessarily all of it. In spite of the high affinity for soluble anhydrite to pick up water vapor, the samples with some soluble anhydrite after treatment still showed significant reduction in the water demand.

In all cases, increased time of treatment reduces the water demand without a corresponding increase in residual gypsum content.

Example 2

Different Gypsum Types

Much of the gypsum used in North America today is the synthetic gypsum that is produced by the scrubbing of flue gases containing sulfur dioxide from coal burning power plants, commonly called flue gas desulfurization gypsum or desulfogypsum. A sample of flue gas desulfurization gypsum (LDSG) was obtained from a commercial gypsum board plant, the gypsum being produced at the OPG Lambton generating station near Sarnia, Ontario. As for Example 1, the treatment process was undertaken for freshly calcined plaster produced by the laboratory continuous kettle at a calcination temperature of 160° C., once again this corresponding to the initial plaster temperature. The overall temperature of the chamber prior to addition of the plaster was approximately the calcination temperature to make sure that the plaster was not cooled by the pressure chamber. The steam was provided by a boiler operating at 150° C. The pressure inside the chamber was monitored and steam was added until the target pressure was achieved, being topped up as needed to maintain the pressure. This pressure was maintained for various time periods to determine the impact of treatment time for trials at 40 $psi_g$ steam pressure, these pressures establishing the minimum steam temperatures within the chamber assuming saturated steam conditions. Since the plaster was above this temperature the steam superheated to the plaster temperature. Results of these tests are shown below.

| Synthetic Gypsum Source | Pressure (psig) | Time (min) | Free water % | AIII % | HH % | DH % | Other % | Mineral Average Particle Size (µm) | WD (ml/100 g) |
|---|---|---|---|---|---|---|---|---|---|
| LDSG | untreated |   | 0.00 | 5.16 | 83.53 | 3.37 | 7.94 | 56.1 | 71 |
| LDSG | 40 | 3 | 0.13 | 2.15 | 86.72 | 3.26 | 7.87 |  | 57.5 |
| LDSG | 40 | 5 | 0.13 | 0.28 | 89.24 | 2.48 | 8.01 |  | 56.5 |

The new treatment process works well with synthetic gypsum by reducing the water demand with increasing treatment time. Note that once again the process resulted in a reduction in both the soluble anhydrite content and the residual gypsum content, turning both into hemihydrate.

Example 3

Treatment Pressure and Treatment Time

The previous examples showed that with increasing treatment time there was a corresponding increase in the reduction of the machine mix water demand. Tests were also undertaken at different pressures to determine if the overall pressure of steam treatment would have an impact on the rate and degree of water demand reduction. Continuously produced laboratory scale kettle plaster was subjected to treatments at various times and pressures. The results are shown below. MB refers to the moisture balance measurement, the overall weight loss expressed as percentage that takes place upon heating of the sample up to 200° C.

The treatment process was undertaken for freshly calcined plaster produced by the laboratory continuous kettle at a calcination temperature of 180° C. and 146° C., once again this corresponding to the initial plaster temperatures. The overall temperature of the chamber prior to addition of the plaster was approximately the calcination temperature to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for various time periods to determine the impact of treatment time for trials at 40 $psi_g$ and 60 $psi_g$ steam pressure, these pressures establishing the minimum steam temperatures within the chamber assuming saturated steam conditions. Since the plaster made at 180° C. was above this steam temperature the steam superheated to the plaster temperature. For the plaster made at 146° C. the steam applied above 47 $psi_g$ will represent condensing conditions and the steam will condense onto the plaster heating the plaster to the boiler temperature of about 150° C.

The Effect of Steam Pressure Applied Over Time on Machine Mix Water Demand treated in the same manner as for Examples 1-3. This sample is offered to the market as a typical beta plaster, likely produced by a large scale continuous kettle. This plaster has a normal machine mix water demand of about 70-75 ml per 100 g. The flow properties were measured by pouring the slurry into a pipe of dimensions 4 inch high with diameter 2 inches and then allowing the slurry to flow from the pipe by raising it from the table (a commonly used board plant slump test). In this case the spread was measured for machine mix slurry samples at 75 ml per 100 g of plaster. The plaster was heated to 150° C. before the steam treatment in an attempt to avoid

| Gypsum at Calcination Temp (deg C.) | Pressure (psig) | Time (min) | MB (%) | Free water % | AIII % | HH % | DH % | Other % | Mineral Average Particle Size (μm) | WD (ml/100 g) |
|---|---|---|---|---|---|---|---|---|---|---|
| LDSG -180 | untreated | | 6.29 | 0.08 | 0.00 | 88.98 | 3.66 | 7.36 | 30-35 (as in Example 2) | 85 |
| LDSG -180 | 40 | 0.5 | 6.3 | | | | | | | 74 |
| LDSG -180 | 40 | 1 | 6.34 | | | | | | | 65 |
| LDSG -180 | 40 | 2 | 6.17 | | | | | | | 66.5 |
| LDSG -180 | 60 | 0.5 | 6.28 | 0.02 | 0.00 | 89.60 | 3.13 | 7.27 | | 67 |
| LDSG -180 | 60 | 1 | 6.20 | 0.01 | 0.00 | 89.57 | 2.69 | 7.74 | | 59 |
| LDSG -180 | 60 | 2 | 6.16 | 0.04 | 0.00 | 89.89 | 3.45 | 6.66 | | 56 |
| LDSG -180 | 60 | 5 | 6.34 | | | | | | | 55.5 |
| LDSG -180 | 60 | 10 | 8.92 | | | | | | | 55 |
| HP1 - 146 | untreated | | | 0.06 | 0.00 | 86.36 | 4.58 | 9.06 | 35.5 (as in Example 1) | 83 |
| HP1 - 146 | 20 | 0.5 | 6.02 | 0.15 | 0.00 | 88.03 | 4.09 | 7.88 | | 82 |
| HP1 - 146 | 29 | 1 | 6.10 | 0.23 | 0.00 | 88.46 | 3.17 | 8.36 | | 81 |
| HP1 - 146 | 31 | 1.5 | 6.23 | 0.31 | 0.00 | 88.76 | 3.44 | 7.80 | | 78 |
| HP1 - 146 | 41 | 3 | 5.84 | 0.23 | 0.00 | 87.76 | 3.38 | 8.85 | | 72 |
| HP1 - 146 | 53 | 5 | 5.92 | 0.21 | 0.00 | 88.18 | 3.18 | 8.65 | | 64 |
| HP1 - 146 | 59 | 10 | 6.76 | 1.07 | 0.00 | 88.56 | 3.17 | 8.27 | | 57 |
| HP1 - 146 | 60 | 20 | 6.22 | 0.43 | 0.00 | 88.88 | 2.86 | 8.26 | | 56 |

In every case tested for different types of calcinations and different gypsum samples it was found that higher pressures resulted in lower water demands and longer treatment times resulted in lower water demands.

Note that in most cases described, the steam pressure was preferentially supplied at a pressure corresponding to a dew point temperature which would be considered below the temperature of the plaster (as determined by the calcination temperature) in order to not promote condensation into the plaster. For example at 60 $psi_g$, steam condenses at 153° C. Thus, at a 180° C. plaster temperature, conditions would dictate that no condensation would be expected to take place. Alternatively, in the last 3 examples of HP1 (146° C. plaster temperature, treated for 5, 10 and 20 minutes) the steam condensation temperature was above the temperature of the plaster. It would be expected that this would create condensing conditions for water vapour into the plaster bed which could promote the undesirable conversion of hemihydrate back to gypsum if the plaster was allowed to cool below 60° C. However, the phase analysis measurements are similar to the non condensing situation and the water demand was similarly reduced as in the other examples. A small increase in free moisture was observed.

Example 4

Different Calcination Processes

To demonstrate that this process works with other calcination processes, a sample of USG Not Moulding Plaster was condensing steam into the plaster on steam treatment. The overall temperature of the chamber prior to addition of the plaster was approximately the calcination temperature to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for various time periods to determine the impact of treatment time for trials at 40 $psi_g$ steam pressure, these pressures establishing the minimum steam temperatures within the chamber assuming saturated steam conditions. Since the plaster heated to 150° C. was above this temperature the steam superheated to the plaster temperature.

The results of these tests are shown below. Note that the treated commercial No 1 Moulding Plaster had a much larger spread after treatment.

Another calcination method was also investigated, this being a tray calcination performed with gypsum HP1 as referred to in Example 1. In the tray calcination, 1 kg of gypsum powder was spread in a thin bed on a 17 inch×11 inch baking tray and placed in an oven at 140° C. for 6 hours. Treated samples were produced by immediately adding the hot untreated tray calcined material to the treatment chamber and treating for the reported time periods and pressures. The overall temperature of the chamber prior to addition of the plaster was approximately the calcination temperature to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for various time periods to determine the impact of treatment time for trials at 36 $psi_g$ steam pressure, these pressures establishing the minimum steam temperatures within the chamber assuming saturated steam conditions. Since the plaster was above this temperature the steam superheated to the plaster temperature.

It was noticed that when there was significant soluble anhydrite present then the plaster temperature would rise as a consequence of the exothermic conversion from soluble anhydrite to hemihydrate. It the chamber was closed while this temperature increase was taking place the chamber and plaster temperature would rise somewhat, but only as expected from this chemical conversion.

Similarly, a batch calcination was performed in the laboratory scale kettle apparatus by adding high purity HP1 gypsum to the preheated kettle over 50 minutes while maintaining a temperature of 120° C. Calcination was allowed to continue over a further period of 1 hour 10 minutes. After 2 hours total, the temperature in the kettle characteristically began to rise quickly, indicating the end of the calcination cycle. Subsequently, the kettle was discharged at 155° C. Approximately 9 kg of plaster was produced in the batch. Again, untreated batch calcined material was added to the treatment chamber, still hot from the calcination process and treated as described. The overall temperature of the chamber prior to addition of the plaster was approximately 155° C. to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for 5 minutes at 53 $psi_g$ steam pressure, these pressures establishing the minimum steam temperatures within the chamber assuming saturated steam conditions. Since the plaster heated to 150° C. was above this steam temperature the steam superheated to the plaster temperature.

The Effect of Calcination Process on Treatment Results

Example 5

Different Plaster Analysis

Different calcination processes produce different amounts of soluble anhydrite and it is well known that soluble anhydrite is converted back to hemihydrate by the absorption of water vapour from the air at room temperature.

In this example three desulfogypsum (LDSG) calcinations were performed at three different calcination temperatures (160° C., 180° C., and 190° C.) in order to increase the level of soluble anhydrite that would be found in the untreated plaster. These three plasters were treated by this novel process to determine the overall impact on the water demand. The overall temperature of the chamber prior to addition of the plaster was approximately the calcination temperature to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for various time periods to determine the impact of treatment time for trials at about 40, 58 and 65 $psi_g$ steam pressure, these pressures establishing the minimum steam temperatures within the chamber assuming saturated steam conditions. Since the plaster was above this temperature the steam superheated to the plaster temperature.

The calcinations were repeated using natural gypsum HP1. In this example two calcinations were performed at two different calcination temperatures (155° C., and 170° C.) in order to increase the level of soluble anhydrite that would be found in the untreated plaster. These two plasters were treated by this novel process to determine the overall impact on the water demand. The overall temperature of the chamber prior to addition of the plaster was approximately the calcination temperature to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for various time periods to determine the impact of treatment time for trials at 58 $psi_g$ steam pressure, these pressures establishing the minimum steam temperatures within the chamber assuming saturated steam conditions. Since the plaster was above this temperature the steam superheated to the plaster temperature.

The results of these studies are shown below.

| Calcination process | Pressure (psig) | Time (min) | MB (%) | Free water % | AIII % | HH % | DH % | Other % | Tested Water Demand (mL/100 g) | Spread (inches) |
|---|---|---|---|---|---|---|---|---|---|---|
| USG No 1 moulding plaster | untreated | | 4.43 | | | | | | 75 | 11.5 |
| USG No 1 moulding plaster | 40 | 10 | 4.09 | | | | | | 75 | 13.5 |
| Tray calcined | untreated | | 1.10 | 0.00 | 75.27 | 13.92 | 2.54 | 8.27 | 86 | 7.6 |
| Tray calcined | 36 | 3 | 3.03 | 0.00 | 39.00 | 50.47 | 2.07 | 8.46 | 86 | 9.8 |
| Batch kettle | untreated | | 5.26 | | | | | | 93.5 | 7.5 |
| Batch kettle | 53 | 5 | 5.75 | | | | | | 93.5 | 9 |

This process is expected to work advantageously with plaster produced by the other commonly used calcination processes to make beta hemihydrate plasters.

| Calcination Temperature (degrees C.) | Pressure (psig) | Time (min) | Free water % | AIII % | HH % | DH % | Other % | WD (ml/100 g) |
|---|---|---|---|---|---|---|---|---|
| LDSG 160 | untreated |   | 0.85 | 0.00 |   |   |   | 91 |
| LDSG 160 | 40 | 2 |   |   |   |   |   | 54 |
| LDSG 180 | untreated | 0 | 0.08 | 0.00 |   |   |   | 85 |
| LDSG 180 | 40 | 1 | 0.06 | 0.00 |   |   |   | 65 |
| LDSG 180 | 40 | 2 |   |   |   |   |   | 66.5 |
| LDSG 180 | 65 | 1 |   |   |   |   |   | 59 |
| LDSG 180 | 65 | 5 |   |   |   |   |   | 55.5 |
| LDSG 190 | untreated | 0 | 0.00 | 4.14 |   |   |   | 75 |
| LDSG 190 | 40 | 1 | 0.13 | 0.23 |   |   |   | 65 |
| LDSG 190 | 65 | 1 |   |   |   |   |   | 60 |
| LDSG 190 | 65 | 5 |   |   |   |   |   | 55.5 |
| HP1 155 | untreated |   | 0.00 | 1.89 | 85.47 | 3.87 | 8.77 | 80 |
| HP1 155 | 58 | 5 | 0.00 | 0.35 | 87.58 | 3.33 | 8.74 | 62 |
| HP1 170 | untreated |   | 0.00 | 8.84 | 76.56 | 4.05 | 10.55 | 76 |
| HP1 170 | 58 | 5 | 0.38 | 0.00 | 85.50 | 3.32 | 11.19 | 59 |

Example 6

Response to Accelerator and Setting Properties

One property that is important in the use of beta hemihydrate is to be able to set the slurry quickly. Acceleration of the set time is most commonly done by adding finely ground gypsum to act as seed crystals for the dissolving hemihydrate. Chemical accelerators such as potassium sulfate are also used but often result in other problems in application as a result of their high solubility and ability to migrate to the surface during drying.

Two examples of calcined gypsums were produced in the laboratory continuous kettle apparatus described above using LDSG and HP1. The LDSG was calcined at 175° C. and the HP1 was calcined at 155° C. The overall temperature of the chamber prior to addition of the plaster was approximately the calcination temperature to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for various time periods to determine the impact of treatment time for trials at about 40-45 $psi_g$ and 60 $psi_g$ steam pressure, these pressures establishing the minimum steam temperatures within the chamber assuming saturated steam conditions. Since the plaster was above this temperature the steam superheated to the plaster temperature.

Plasters were sampled without treatment as well as at various levels of treatment. The setting times were measured at different levels of ground gypsum accelerator addition to determine how effective the ground gypsum was at accelerating the set time. The reported set time measurement was made at the time required to achieve 98% of the temperature rise in the hydration curve as the slurry sets. All measurements were made at the indicated mix water demands.

The results below show that the set time for treated samples may be slowed a marginal amount as compared to equivalent untreated samples with added 0.3% of naphthalene sulfonate dispersing agent (by weight of plaster) but that this can be easily accommodated with addition of a fraction more ground gypsum accelerator. Previous examples have shown that the treatment process reduces the residual gypsum content and so it is not surprising that some addition of gypsum may be necessary to achieve an equivalent set time.

| Sample | Accelerator Usage (g per 400 g mix) | Plaster Water Demand (ml/100 g) | Mix Water Demand (ml/100 g) | 98% set time (sec) | % hydration at maximum rate of rise |
|---|---|---|---|---|---|
| HP1 - untreated + 0.3 wt % NS | 0.0 | 81 | 73 | 1693 | 68.3 |
| HP1 - untreated + 0.3 wt % NS | 1.4 | 81 | 73 | 786 | 67.4 |
| HP1 - untreated + 0.3 wt % NS | 3.0 | 81 | 73 | 664 | 65.4 |
| HP1 - untreated + 0.3 wt % NS | 4.5 | 81 | 73 | 592 | 71.2 |
| HP1 - treated 140 sec 45 psig | 0.0 | 73 | 73 | 1827 | 71.3 |
| HP1 - treated 140 sec 45 psig | 1.4 | 73 | 73 | 772 | 66.0 |
| HP1 - treated 140 sec 45 psig | 3.0 | 73 | 73 | 726 | 68.5 |
| HP1 - treated 140 sec 45 psig | 4.5 | 73 | 73 | 666 | 64.2 |
| HP1 - treated 180 sec 40 psig | 0.0 | 58 | 58 | 1814 | 59.4 |
| HP1 - treated 180 sec 40 psig | 4.5 | 58 | 58 | 959 | 54.1 |

A comparison was also made with a typical alpha hemihydrate, Hydrocal from USG, Chicago USA. As can be seen by the results in the following table, a set time of less than 1000 seconds was not achieved using alpha hemihydrate even with significant addition of accelerator. The set time was reduced to 1664 seconds by doubling the accelerator, but adding even more accelerator did not shorten the set time further.

It is known that grinding the alpha hemihydrate to a finer particle size will help reduce the set time but as can be seen from the results below, even with the ball milling of the Hydrocal for three hours the set time was only reduced to 1400 seconds.

| Sample | Accelerator Usage (g per 400 g mix) | Ball Milling Time (hr) | Plaster Water Demand (ml/100 g) | Mix Water Demand (ml/100 g) | 98% set time (sec) | % hydration at max rate of rise |
|---|---|---|---|---|---|---|
| HP1 - treated 140 sec 45 psig | 3.0 | 0 | 73 | 73 | 726 | 68.5 |
| USG Hydrocal | 0.0 | 0 | 40 | 66 | 2835 | 75.6 |
| USG Hydrocal | 0.9 | 0 | 40 | 66 | 1920 | 36.7 |
| USG Hydrocal | 2.0 | 0 | 40 | 66 | 1664 | 37.7 |
| USG Hydrocal | 3.0 | 0 | 40 | 66 | 1670 | 30.5 |
| USG Hydrocal | 0.7 | 0 | 40 | 66 | 1962 | 58.8 |
| USG Hydrocal | 0.7 | 1 | 40 | 66 | 1592 | 31.5 |
| USG Hydrocal | 0.7 | 2 | 40 | 66 | 1403 | 47.3 |
| USG Hydrocal | 0.7 | 3 | 40 | 66 | 1416 | 37.1 |

To further demonstrate the advantage of the novel treatment process, a comparison was made of the setting properties of a blend of alpha and beta hemihydrate at the same purity and water demand of a treated plaster. This comparison was performed at different ratios of blend with both LDSG and HP1 to achieve an effective mix water demand that would be equivalent to treated samples.

In one example, 325 g of untreated HP1 beta plaster (water demand 81 ml per 100 g) was blended with 75 g of USG Hydrocal (water demand 40 ml per 100 g), resulting in an 81% beta, 19% alpha blend that measured a water demand of 73 ml per 100 g. Comparing these results with an equivalent 73 ml per 100 g treated sample (140 sec 45 psi$_g$) shows that mix gypsum purity to ensure that the treated and blend mixtures would have an equivalent temperature rise. For the treated LDSG plaster only 1 g of accelerator was needed to achieve the equivalent 98% hydration time of approximately 1200 seconds as the alpha beta blend with 4 g of accelerator. To achieve the required final set time the alpha/beta blend must start the setting process earlier since it has a much slower set near the end of hydration. The rate of hydration during the setting process can be measured by taking the slope of the temperature rise hydration curve. The % hydration at maximum slope was 63.8% for the treated plaster whereas it was only at 49.6% for the alpha/beta blend.

| Sample | Accelerator Usage (g per 400 g mix) | Plaster Water Demand (ml/100 g) | Mix Water Demand (ml/100 g) | 98% set time (sec) | % hydration at max rate of rise | (98% set time of example/ 98% set time of equivalent untreated sample)*100 |
|---|---|---|---|---|---|---|
| HP1 - treated 140 sec 45 psig | 0.0 | 73 | 73 | 1827 | 71.3 | 107.9 |
| HP1 - treated 140 sec 45 psig | 1.4 | 73 | 73 | 772 | 66.0 | 98.2 |
| HP1 - treated 140 sec 45 psig | 3.0 | 73 | 73 | 726 | 68.5 | 109.3 |
| HP1 - treated 140 sec 45 psig | 4.5 | 73 | 73 | 666 | 64.2 | 112.5 |
| HP1 blend (325 g untreated/ 75 g Hydrocal) | 0.0 | 81/40 | 73 | 1965 | 65.1 | 116.1 |
| HP1 blend (325 g untreated/ 75 g Hydrocal) | 1.4 | 81/40 | 73 | 912 | 64.1 | 116.0 |
| HP1 blend (325 g untreated/ 75 g Hydrocal) | 3.0 | 81/40 | 73 | 777 | 65.6 | 117.0 |
| HP1 blend (325 g untreated/ 75 g Hydrocal) | 4.5 | 81/40 | 73 | 714 | 55.5 | 120.6 |
| LDSG - treated 180 sec 60 psig | 1 | 57 | 57 | 1262 | 63.8 | |
| LSDG blend (160 g untreated/ 228 g B5 alpha/12 g CaCO3)) | 0 | 88/40 | 57 | 2280 | 58.1 | |
| LSDG blend (160 g untreated/ 228 g B5 alpha/12 g CaCO3)) | 4 | 88/40 | 57 | 1154 | 49.6 | | the blend tends to set slower and that the percent hydration at the maximum rate of rise is also slower. Note that for the calcined HP1 samples, the ratio of the treated plaster 98% hydration time to the untreated 98% hydration time was no more than 112.5%, whereas the alpha/beta blends of equivalent water demand and accelerator usage show the 98% hydration times of the blend to be as much as 120.6% of the untreated sample.

In another example, 160 g of untreated LDSG beta plaster (water demand 88 ml per 100 g) was blended with 228 g of Denscal Gypsum B5 alpha plaster (water demand 40 ml per 100 g) from Georgia-Pacific, Atlanta, Ga., USA and 12 g of "Grow Lime" calcium carbonate from All Treat Farms Ltd., Arthur, Ontario, Canada, resulting in an 40% beta, 60% alpha blend that measured a water demand of 57 ml per 100 g. The calcium carbonate was added to achieve an equivalent overall Example 7

Compressive Strength Properties

It is known that spraying the hemihydrate with water can reduce the water demand of a plaster, although this does result in the production of gypsum in the hemihydrate. It is also known that if the hemihydrate is heated hot enough during calcination then some of the gypsum is converted to insoluble anhydrite which also reduces the water demand of the plaster. While the reduction in water demand is advantageous, it is recognized that the gypsum and anhydrite produced by these processes cannot contribute to the overall strength of the set plaster to the same extent as the hemihydrate that remains. Previous patents related to post calcination plaster treatments have discussed this problem and offered ways to reduce the deleterious impact of these treatments on strength developed. The most common way to reduce water demand is to use dispersing agents, such as condensed naphthalene sulfonates, to make the mix more fluid. It is known that these materials have minimal effect on the strength of the dried set gypsum.

In order to test the effect to this treatment on the compressive strength, measurements were performed on 2 inch cubes made from untreated TA plaster (water demand 80 ml per 100 g) made with the water plaster ratio adjusted using a commercially available naphthalene sulfonate dispersing agent, Diloflo GS20; a 40% solids solution from GEO Specialty Chemicals Inc., Lafayette, Ind., USA; compared with similar TA 3 minute 60 psig treated plaster of original water demand 66 ml per 100 g as per this invention. The mix water demand used for both cubes sets was 68 ml per 100 g, with the dry cube weights and compressive strengths shown in the table below.

The treatment process was undertaken for freshly calcined plaster produced from the natural gypsum TA calcined in the laboratory continuous kettle at a calcination temperature of 165° C., once again this representing the plaster temperature. The overall temperature of the chamber prior to addition of the plaster was approximately the calcination temperature to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for various time periods to determine the impact of treatment time for trials at 60 $psi_g$ steam pressure, these pressures establishing the minimum steam temperatures within the chamber assuming saturated steam conditions. Since the plaster made at 165° C. was above this temperature the steam superheated to the plaster temperature.

Another example used plaster made from the high purity gypsum HP1. The treatment process was undertaken for freshly calcined plaster produced from the natural gypsum HP1 calcined in the laboratory continuous kettle at a calcination temperature of 155° C., once again this representing the plaster temperature. The overall temperature of the chamber prior to addition of the plaster was approximately the calcination temperature to make sure that the plaster was not cooled by the pressure chamber. The steam was provided by a boiler operating at about 150° C. The pressure inside the chamber was monitored and steam was added until the target pressure was achieved, being topped up as needed to maintain the pressure. This pressure was maintained for various time periods to determine the impact of treatment time for trials at 60 $psi_g$ steam pressure, these pressures establishing the minimum steam temperatures within the chamber assuming saturated steam conditions. Since the plaster made at 155° C. was above this temperature the steam superheated to the plaster temperature.

This HP1 plaster had untreated water demand of 83 ml per 100 g but was again used in a cube mix with the water plaster ratio adjusted using the commercially available naphthalene sulfonate dispersing agent, Disal GPS; a solid powder from Handy Chemicals Ltd., Candiac, Quebec, Canada. The sample for comparison labeled HP1 treated was a blend of 38% untreated sample of 83 ml per 100 g water demand and 62% of a 3 minute 60 $psi_g$ treated sample of water demand 63 ml per 100 g. The water demand of both cubes was similarly 68 ml per 100 g.

In both comparisons, the amount of accelerator was slightly modified in the treated case to include more accelerator to normalize the effect of set time on strength.

| Sample | Accelerator Weight % of plaster | Dispersant Weight % of plaster | dry weight (g) | | | compressive strength (psi) | | |
|---|---|---|---|---|---|---|---|---|
| | | | A | B | C | A | B | C |
| TA1 - untreated | 0.32% | 0.40% | 144.5 | 145.6 | 145.3 | 2610 | 2905 | 2930 |
| TA1 - 3 minute 60 psig treated | 0.44% | 0 | 148.1 | 149.1 | 149 | 2970 | 2897 | 3015 |
| HP1 - untreated | 0.17% | 0.38% | 143.8 | 144.8 | | 2568 | 2650 | |
| HP1 - 62% 3 minute 60 psig treated/ 38% untreated blend | 0.22% | 0 | 143.1 | 142.3 | | 2433 | 2310 | |

As can be seen from these results there is no effect on the strength of the cubes through the use of this treatment process.

Example 8

Plant Trials with Pilot Equipment

A plant trial was performed using a full scale 15 foot diameter continuous production kettle to generate the untreated plaster.

A representative stream of the plaster output from the kettle was diverted from the normal production process using an insulated 6 inch diameter 30 RPM rotating screw conveying system, to feed a trial-scale 20 kg capacity treatment chamber. The measured temperature of the plaster before entering the treatment chamber was 139° C.-144° C. indicating that minimal cooling had taken place. The trial-scale treatment chamber was designed similarly to the described laboratory-scale apparatus, with 2 half-hemisphere, inflatable seal, ball valves, top and bottom of a cylindrical chamber with the input untreated plaster sample entering the chamber from the top while the top valve is open and the bottom valve is closed. During a treatment cycle, both valves were closed and steam was added to the chamber from an industrial boiler that had a maximum steam pressure of 65 $psi_g$ for a measured treatment residence time. In this system, a pressure regulator was added to between the boiler and the steam supply input to the treatment chamber to accurately control the steam pressure being applied. The chamber was also equipped with a fill level indicator to be used to indicate a full load amount of plaster in the chamber in order to maintain a reproducible volume of plaster from one treatment to the next. Results from the trial are included below.

The gypsum raw material used was equivalent to the natural gypsum described as HP1 in Example 1. The kettle calcination temperature was 147° C., operating at a typical continuous plaster production rate of 30 tonne per hour. The plaster was used fresh at a temperature very close to the above calcination temperature. The overall temperature of the chamber prior to addition of the plaster was approximately the calcination temperature to make sure that the plaster was not cooled by the pressure chamber. The steam was provided by a 40 HP boiler operating at about 160° C. with a pressure regulator to give the desired steam pressure. The pressure inside the chamber was monitored and steam was added as available from the boiler through the regulator. This pressure was maintained for various time periods to determine the impact of treatment time for trials at 28 psig, about 40 $psi_g$ and about 60 $psi_g$ steam pressure, these pressures establishing the minimum steam temperatures within the chamber assuming saturated steam conditions. Since the plaster was made at 147° C. then the treatment done at 28 $psi_g$ and 40 psig resulted in a plaster temperature above the steam temperature and the steam would superheat to the plaster temperature. However, the treatment done at about 60 $psi_g$ would result in the plaster being heated by the steam to about 153° C. with some condensation taking place into the plaster.

| Gypsum at Calcination Temp (deg C.) | Pressure (psig) | Time (sec) | MB (%) | Free water % | AIII % | HH % | DH % | Other % | WD (ml/100 g) |
|---|---|---|---|---|---|---|---|---|---|
| 147 | Untreated | 0 | 5.91 | 0.00 | 6.05 | 83.47 | 3.65 | 6.83 | 77 |
| 147 | 28 | 30 | 5.92 | 0.00 | 3.34 | 86.17 | 3.57 | 6.92 | 77 |
| 147 | 28 | 60 | 5.79 | 0.00 | 3.89 | 85.93 | 2.08 | 8.10 | 76 |
| 147 | 28 | 120 | 5.83 | 0.00 | 3.54 | 85.53 | 3.90 | 7.04 | 74 |
| 147 | 28 | 180 | 5.96 | 0.00 | 2.64 | 88.17 | 3.37 | 5.82 | 68 |
| 147 | 28 | 300 | 5.87 | 0.00 | 1.34 | 88.53 | 2.99 | 7.14 | 65 |
| 147 | 40 | 180 | 5.88 | 0.00 | 3.12 | 86.90 | 2.87 | 7.12 | 66 |
| 147 | 40 | 300 | 5.89 | 0.00 | 3.37 | 88.40 | 2.38 | 5.85 | 61 |
| 147 | Untreated | 0 | 5.85 | 0.00 | 3.30 | 85.80 | 3.32 | 7.58 | 78 |
| 147 | 42 | 120 | 5.88 | 0.00 | 3.62 | 84.59 | 3.36 | 8.42 | 67 |
| 147 | 42 | 300 | 5.72 | 0.00 | 3.56 | 84.89 | 3.97 | 7.58 | 60 |
| 147 | 60 | 30 | 5.72 | 0.00 | 3.52 | 84.09 | 3.88 | 8.51 | 67 |
| 147 | 60 | 60 | 5.69 | 0.00 | 4.00 | 85.07 | 3.20 | 7.73 | 65 |
| 147 | 62 | 120 | 5.81 | 0.00 | 2.76 | 86.45 | 3.35 | 7.44 | 59 |
| 147 | 63 | 180 | 5.68 | 0.00 | 3.83 | 85.41 | 2.92 | 7.84 | 58 |
| 147 | 63 | 300 | 5.89 | 0.00 | 3.14 | 85.72 | 2.99 | 8.15 | 57 |
| 147 | 62 | 600 | 5.89 | 0.00 | 0.68 | 88.33 | 3.16 | 7.83 | 55 |
| 147 | 40 | 90 | 5.76 | 0.00 | 3.62 | 85.61 | 2.38 | 8.39 | 69 |

Similar to the lab results of Example 1 and 3, with increasing degrees of the applied treatment process (either pressure or treatment time), the water demand of the initial untreated plaster was reduced. The trend of reduced soluble anhydrite and reduced residual gypsum content was observed in most cases.

We claim:

1. A process for treating beta calcium sulfate hemihydrate comprising:
   a. providing powdered beta calcium sulfate hemihydrate to a pressure chamber;
   b. within the pressure chamber, exposing the beta calcium sulfate hemihydrate to steam at a pressure above atmospheric pressure; and
   c. removing the treated product from the pressure chamber.

2. The process of claim 1, wherein step b. comprises:
   i. providing steam to the pressure chamber to reach the pressure.

3. The process of claim 2, further comprising:
   ii. maintaining the pressure in the pressure chamber above atmospheric for a residence time of at least 5 seconds.

4. The process of claim 3, further comprising:
   iii. releasing the pressure and cooling the beta calcium sulfate hemihydrate to a temperature below 60° C.

5. The process of claim 3, wherein:
   a. the beta calcium sulfate hemihydrate is provided to the pressure chamber at an initial plaster temperature, and the steam is provided to the pressure chamber at an initial steam temperature, and
   b. the initial plaster temperature is between 60° C. and 200° C., the initial steam temperature is between 100° C. and 200° C., the pressure is between 0.1 $psi_g$ and 210 $psi_g$, and the residence time is between 5 seconds and 900 seconds.

6. The process of claim 3, wherein:
   a. the beta calcium sulfate hemihydrate is provided to the pressure chamber at an initial plaster temperature, the steam is provided to the pressure chamber at an initial steam temperature, the pressure chamber is heated to a chamber temperature, and the steam is heated in the pressure chamber to a final steam temperature higher than the initial temperature, and
   b. the chamber temperature is between 115° C. and 200° C., the initial plaster temperature is between 60° C. and 200° C., the initial steam temperature is between 100° C. and 115° C., the final steam temperature is between 115° C. and 200° C., the pressure is between 0.1 $psi_g$ and 210 $psi_g$, and the residence time is between 5 seconds and 900 seconds.

7. The process of claim 2, wherein the steam has a dew point temperature at the pressure, and the steam is provided to the pressure chamber at an initial steam temperature within +/−5° C. of the dew point temperature.

8. The process of claim 2, wherein the steam has a dew point temperature at the pressure, and the steam is provided to the pressure chamber at an initial steam temperature less than the dew point temperature, and is heated in the pressure chamber to a final steam temperature within +/−5° C. of the dew point temperature.

9. The process of claim 2, wherein the steam is provided at an initial steam temperature of between 100° C. and 200° C.

10. The process of claim 2, wherein the steam has a dew point temperature at the pressure, and the beta calcium sulfate hemihydrate is provided to the pressure chamber at a plaster temperature within +/−5° C. of the dew point temperature.

11. The process of claim 1, wherein the pressure is between 0.1 $psi_g$ and 210 $psi_g$.

12. The process of claim 3, wherein residence time is between 5 seconds and 900 seconds.

13. The process of claim 3, wherein the residence time is between 5 seconds and 600 seconds.

14. The process of claim 3, wherein during step ii. additional steam is provided to the pressure chamber.

15. The process of claim 3, wherein during steps i. to ii. the pressure chamber is heated.

16. A process for utilizing the product of the process of claim 1, comprising mixing the treated product with water to form a pourable slurry, wherein 10 parts of the treated product are mixed with less than 7.5 parts water by weight to form the pourable slurry.

17. The process of claim 1, wherein the process is a continuous process.

18. The process of claim 1, wherein the process is a batch process.

19. The process of claim 1, wherein step a. comprises forming a loosely packed bed of powdered beta calcium sulfate hemihydrate in the pressure chamber.

20. The process of claim 1, wherein the steam is superheated.

21. The process of claim 1, further comprising feeding the beta calcium sulfate hemihydrate to the pressure chamber directly from a calcining process.

22. The process of claim 21, wherein the beta calcium sulfate hemihydrate is fed to the pressure chamber at an initial plaster temperature of between about 120° C. to 190° C.

23. The process of claim 1, wherein the beta calcium sulfate hemihydrate is fed to the pressure chamber at an initial plaster temperature of between about 120° C. to 190° C.

* * * * *